Jan. 2, 1940.  R. E. PARIS  2,185,681
ELECTRICAL CALCULATING MACHINE
Filed Aug. 28, 1928   14 Sheets-Sheet 1

Inventor
Robert Edward Paris
By his Attorney
W. A. Sparks

Jan. 2, 1940.　　　　R. E. PARIS　　　　2,185,681
ELECTRICAL CALCULATING MACHINE
Filed Aug. 28, 1928　　14 Sheets-Sheet 3

Inventor
Robert Edward Paris
By his Attorney
H. A. Sparks

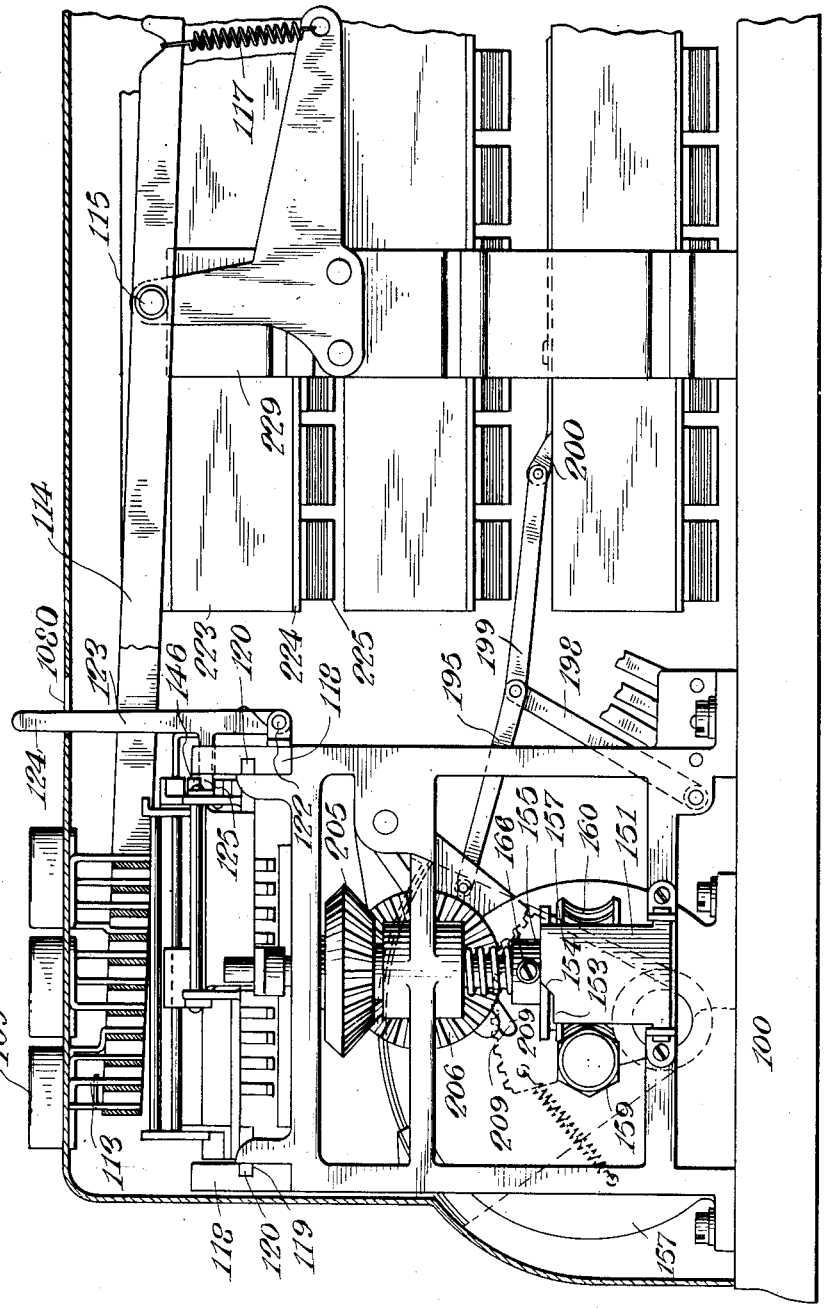

Jan. 2, 1940.  R. E. PARIS  2,185,681
ELECTRICAL CALCULATING MACHINE
Filed Aug. 28, 1928  14 Sheets-Sheet 5
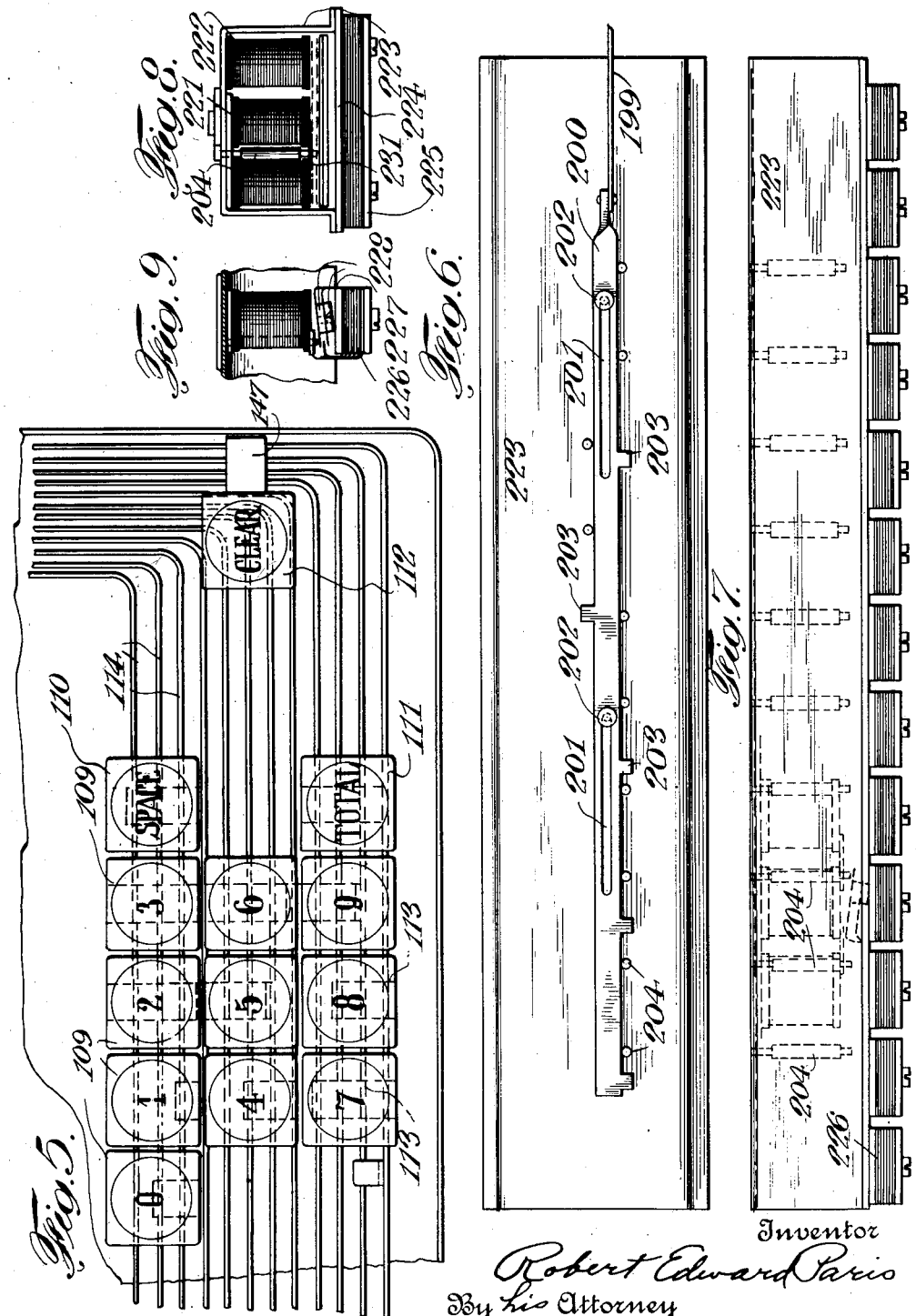

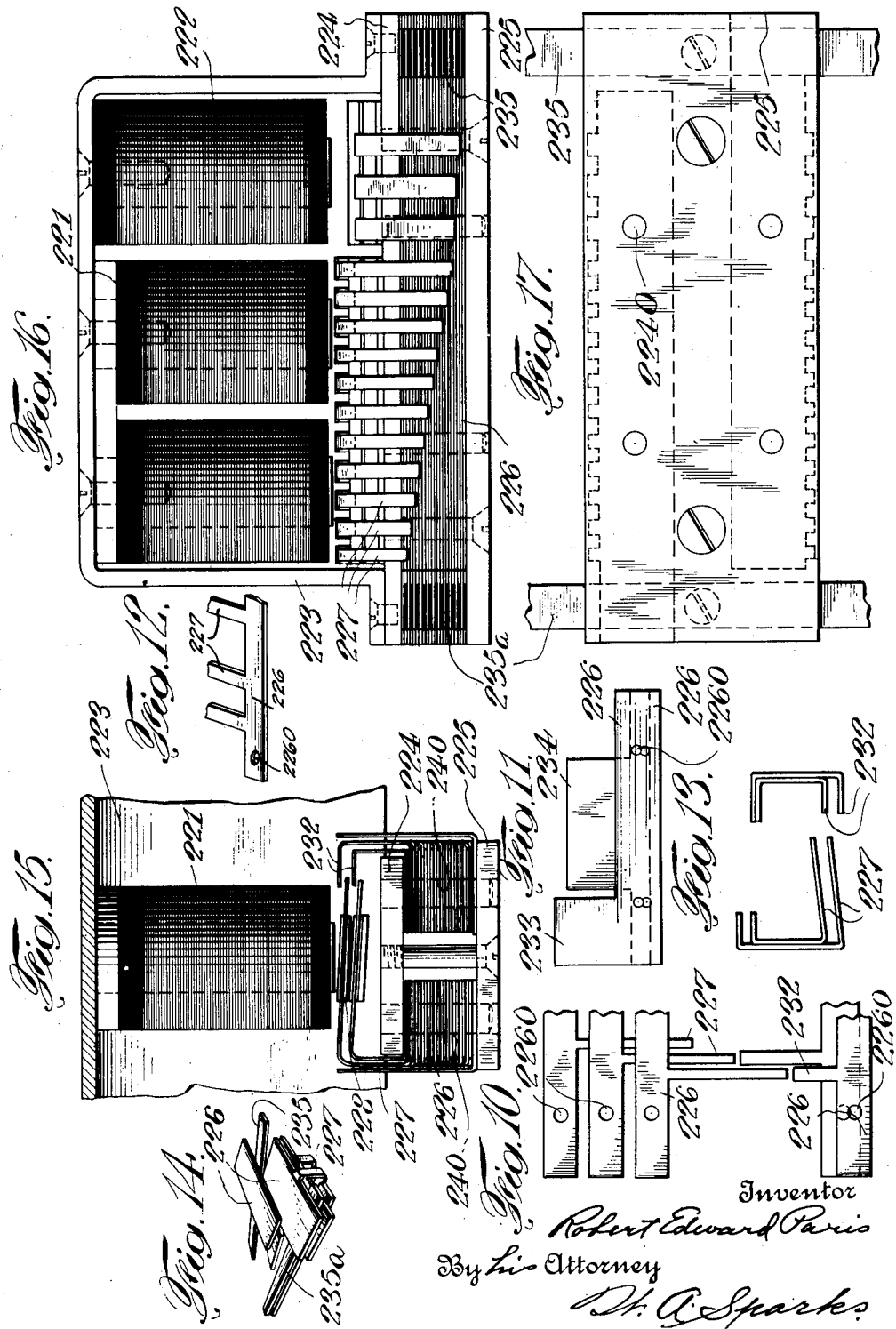

Jan. 2, 1940.  R. E. PARIS  2,185,681
ELECTRICAL CALCULATING MACHINE
Filed Aug. 28, 1928  14 Sheets-Sheet 7

Inventor
Robert Edward Paris
By his Attorney
W. C. Sparks

Jan. 2, 1940.  R. E. PARIS  2,185,681
ELECTRICAL CALCULATING MACHINE
Filed Aug. 28, 1928   14 Sheets-Sheet 8
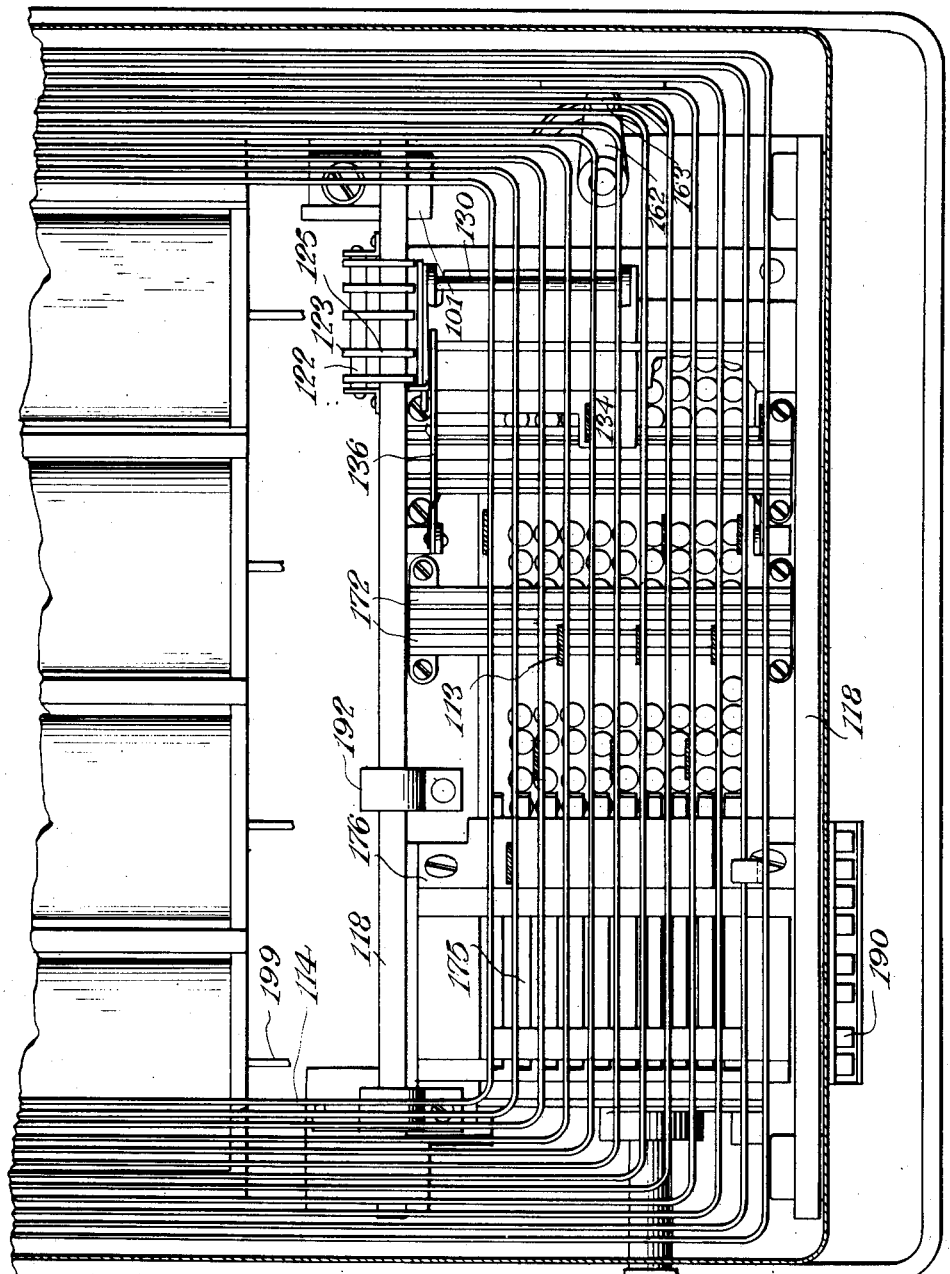

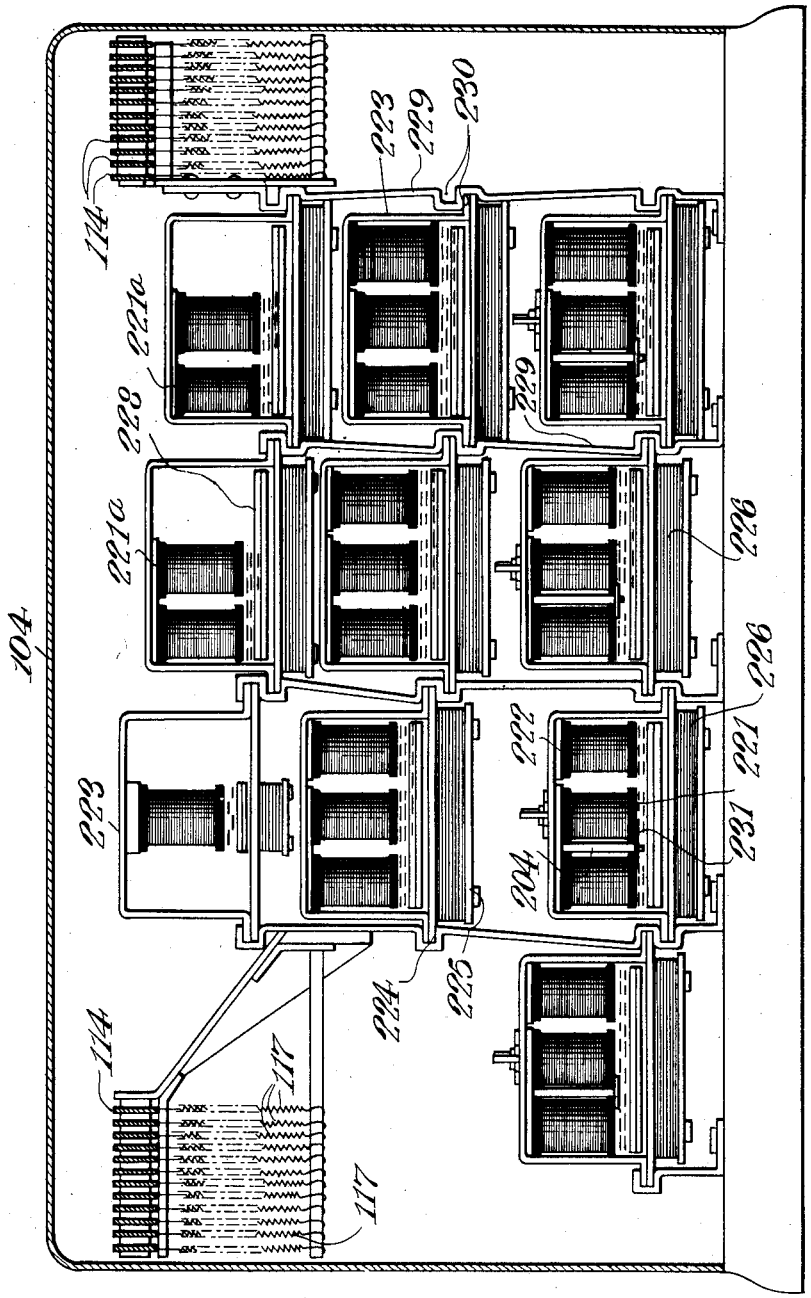

Jan. 2, 1940.　　　　R. E. PARIS　　　　2,185,681
ELECTRICAL CALCULATING MACHINE
Filed Aug. 28, 1928　　　14 Sheets-Sheet 10
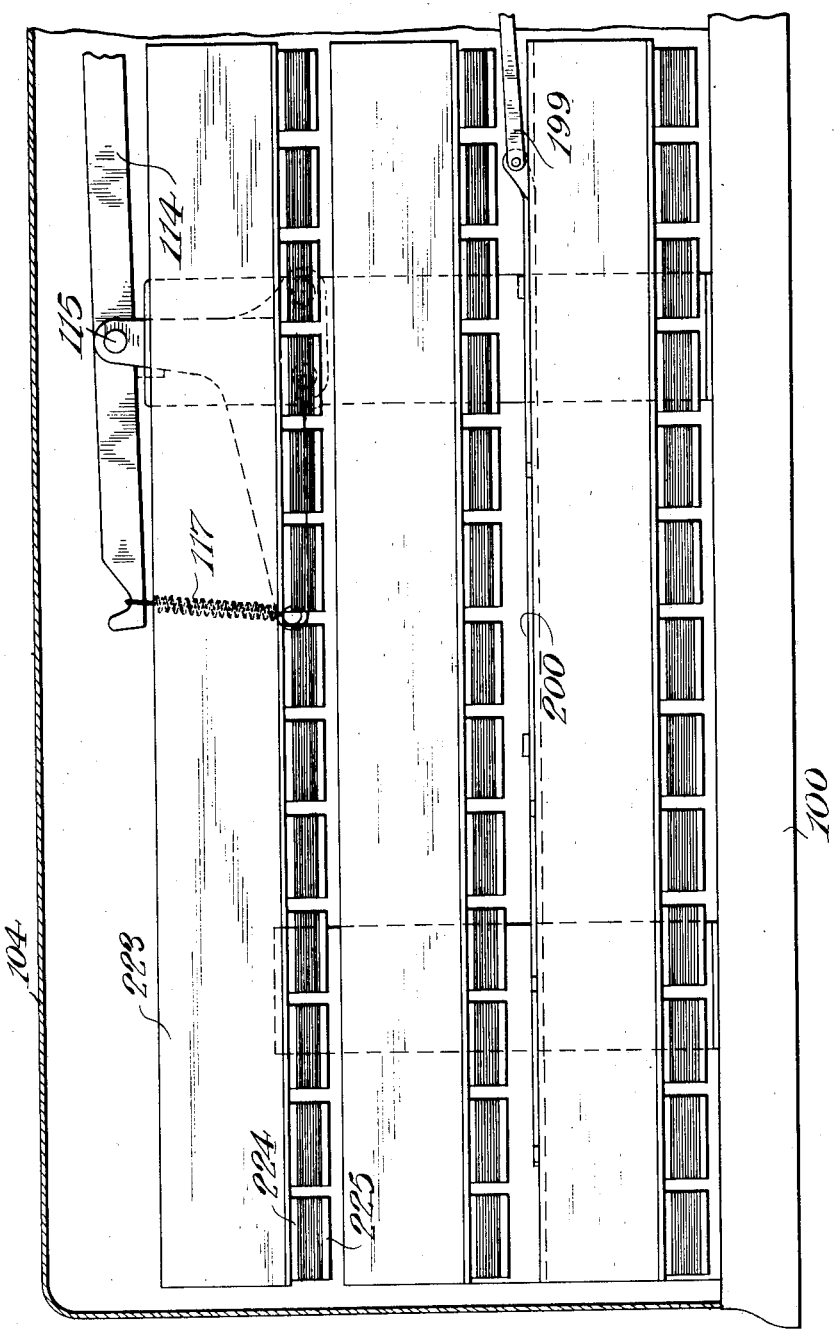
Inventor
Robert Edward Paris
By his Attorney
H. E. Sparkes

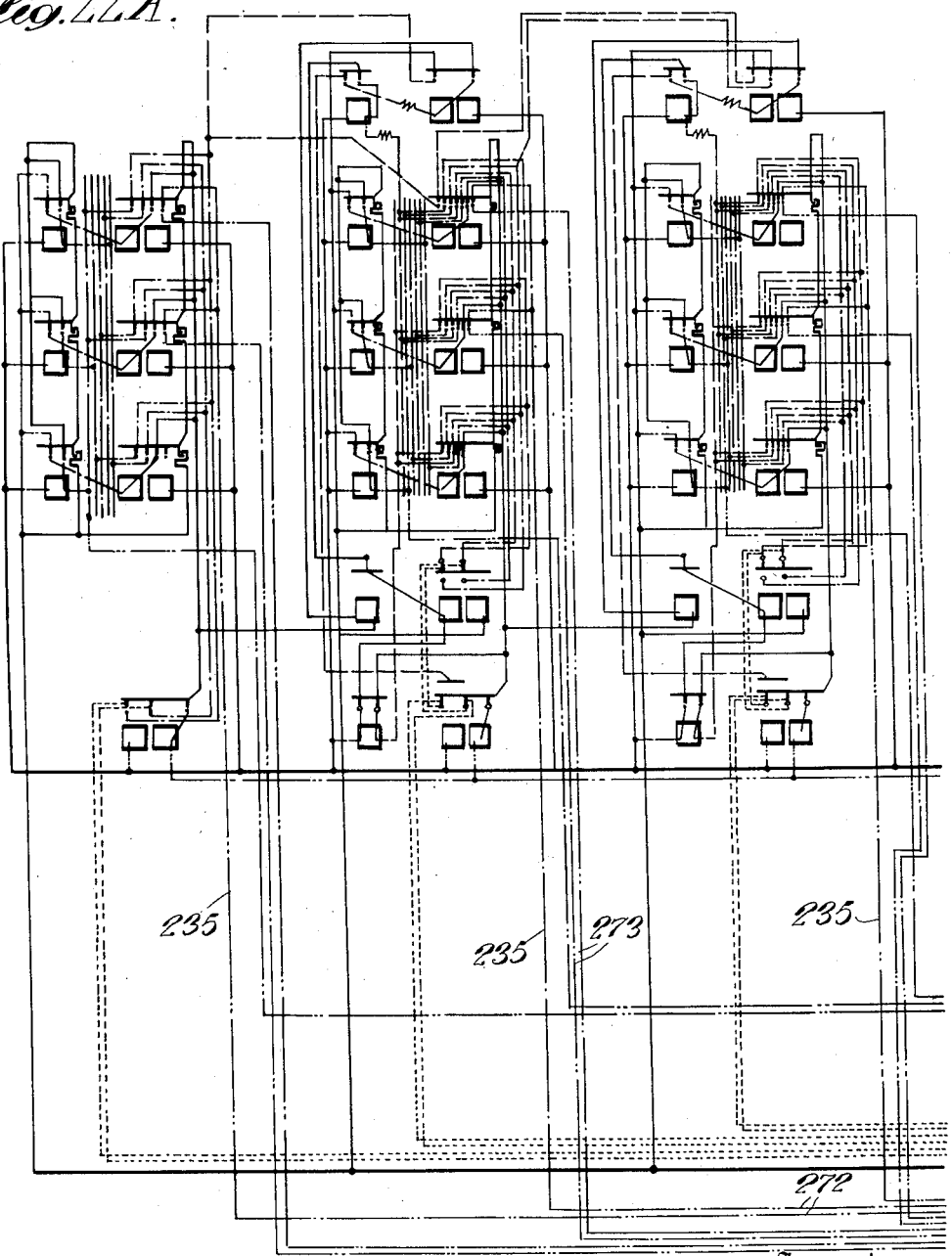

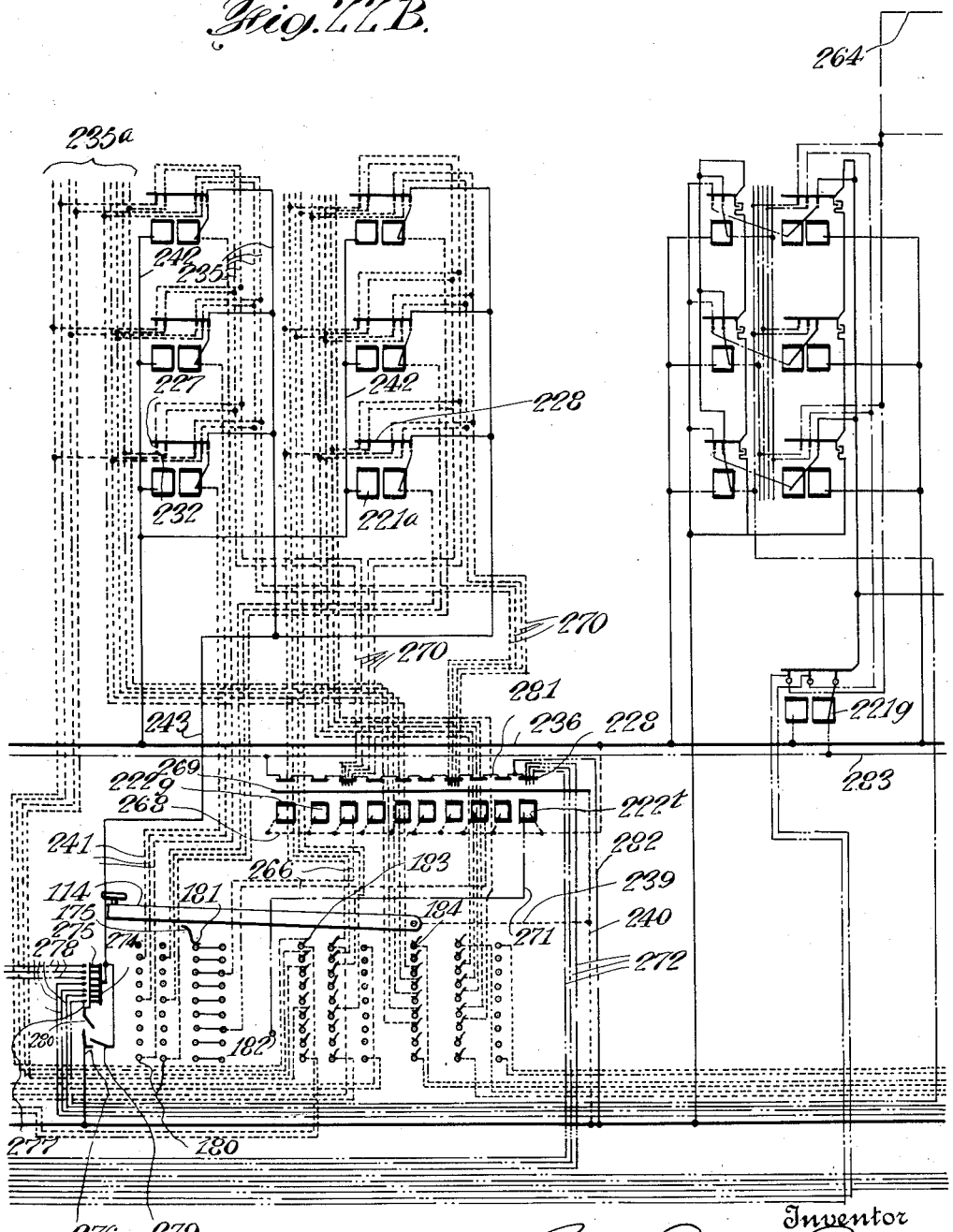

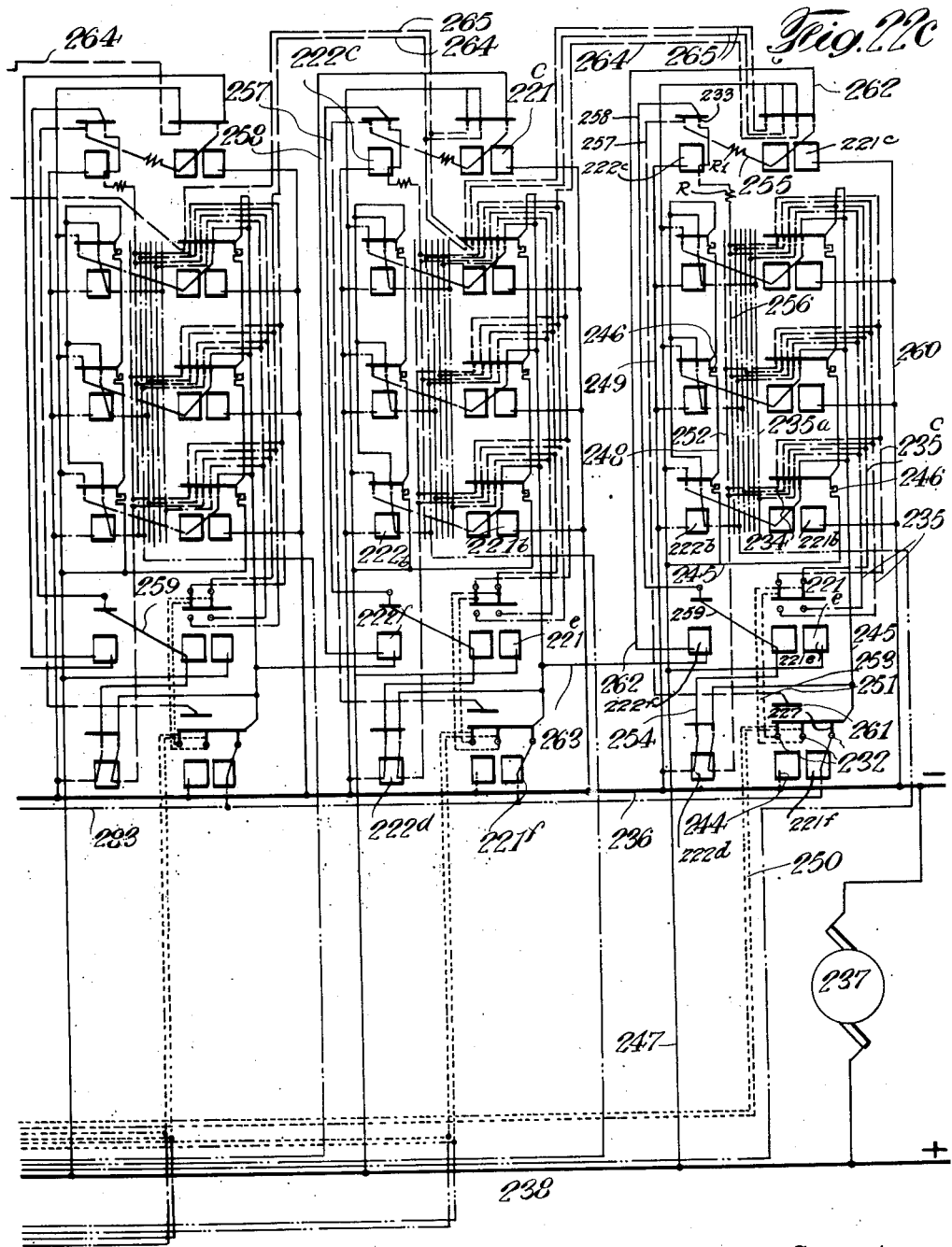

Jan. 2, 1940.          R. E. PARIS          2,185,681
ELECTRICAL CALCULATING MACHINE
Filed Aug. 28, 1928          14 Sheets—Sheet 14

*Fig. 23*
Adding

```
     1 2 3 4 5 6 7 8 9
9    0 1 2 3 4 5 6 7 8

1 2 3 4 5 6 7 8 9
8    9 0 1 2 3 4 5 6 7

1 2 3 4 5 6 7 8 9
7    8 9 0 1 2 3 4 5 6

1 2 3 4 5 6 7 8 9
6    7 8 9 0 1 2 3 4 5

1 2 3 4 5 6 7 8 9
5    6 7 8 9 0 1 2 3 4

1 2 3 4 5 6 7 8 9
4    5 6 7 8 9 0 1 2 3

1 2 3 4 5 6 7 8 9
3    4 5 6 7 8 9 0 1 2

1 2 3 4 5 6 7 8 9
2    3 4 5 6 7 8 9 0 1

1 2 3 4 5 6 7 8 9
1    2 3 4 5 6 7 8 9 0

1 2 3 4 5 6 7 8 9
0    1 2 3 4 5 6 7 8 9
```

*Fig. 24*
Multiplying

```
     1 2 3 4 5 6 7 8 9
9    9 8 7 6 5 4 3 2 1
     - 1 2 3 4 5 6 7 8

1 2 3 4 5 6 7 8 9
8    8 6 4 2 0 8 6 4 2
     - 1 2 3 4 4 5 6 7

1 2 3 4 5 6 7 8 9
7    7 4 1 8 5 2 9 6 3
     - 1 2 2 3 4 4 5 6

1 2 3 4 5 6 7 8 9
6    6 2 8 4 0 6 2 8 4
     - 1 1 2 3 3 4 4 5

1 2 3 4 5 6 7 8 9
5    5 0 5 0 5 0 5 0 5
     - 1 1 2 2 3 3 4 4

1 2 3 4 5 6 7 8 9
4    4 8 2 6 0 4 8 2 6
     - - 1 1 2 2 2 3 3

1 2 3 4 5 6 7 8 9
3    3 6 9 2 5 8 1 4 7
     - - - 1 1 1 2 2 2

1 2 3 4 5 6 7 8 9
2    2 4 6 8 0 2 4 6 8
     - - - - 1 1 1 1 1

1 2 3 4 5 6 7 8 9
1    1 2 3 4 5 6 7 8 9
     - - - - - - - - -
```

Inventor
Robert Edward Paris
By his Attorney
F. C. Sparks

Patented Jan. 2, 1940

2,185,681

UNITED STATES PATENT OFFICE 2,185,681

ELECTRICAL CALCULATING MACHINE

Robert Edward Paris, New York, N. Y., assignor to International Business Machines Corporation, New York, N. Y., a corporation of New York Application August 28, 1928, Serial No. 302,453

15 Claims. (Cl. 235—61)

This invention relates to electrical calculating machines, and particularly to machines of this character for performing addition and multiplication.

One of the principal objects of the invention is to provide electrical registering mechanism whereby the amounts entered in the machine are represented by electrical conditions, as the energizing of magnets representing the digits.

Another object is to utilize electrical instrumentalities rather than mechanical elements insofar as is practicable.

Another object is to produce a machine wherein the multiplicand and multiplier may be entered in the machine by manipulation of a single set of digital keys.

Another object is to produce a calculating machine in which the calculation is automatically performed upon entering the items in the machine; and to produce a machine which will operate at very high speed.

Other objects are to provide novel escapement mechanism, total and product indicating mechanism, carrying or tens-transfer mechanism, armature and switch devices, carriage and indicator return mechanism, and register clearing devices.

With these and other objects in view, as will become apparent as the specification proceeds, the invention comprises certain novel construction and combination and arrangement of parts and electric circuits the essential features of which will be hereinafter fully described, and which are illustrated in the accompanying drawings in which a single embodiment of the invention is shown, and in which:

Fig. 4 is a fragmentary right end elevation of the same.

Fig. 5 is a detail top plan view of the keyboard.

Fig. 6 is a detail plan view of one of the denominational sections of the "lower-digit" product register.

Fig. 7 is a side elevation of the mechanism shown in Fig. 6.

Fig. 8 is a front elevation of a digit magnet and relay.

Fig. 9 is an end elevation of the same.

Fig. 10 is a view showing the blanks carrying the contactors and those carrying the majority of the contacts.

Fig. 11 is a view showing typical "carry" and "no-carry" contact blanks.

Fig. 12 is a fragmentary detail view of one of the contact blanks for the multiplicand register.

Fig. 13 is a detail view showing the method of bending the contact and contactor blanks.

Fig. 14 is a detail perspective view showing the manner of connecting the contact and contactor blanks of a denomination.

Fig. 15 is an enlarged end elevation of one of the magnets and its connections.

Fig. 16 is a detail elevation of one of the adding magnets with its relay and connections.

Fig. 17 is a bottom view of the parts shown in Fig. 16.

Fig. 19 is a fragmentary top plan view showing principally mechanism directly operated by the keys.

Fig. 20 is a front elevation showing the means for mounting the magnets and relays and their connections.

Fig. 21 is a fragmentary side elevation of the same.

Figure 1:
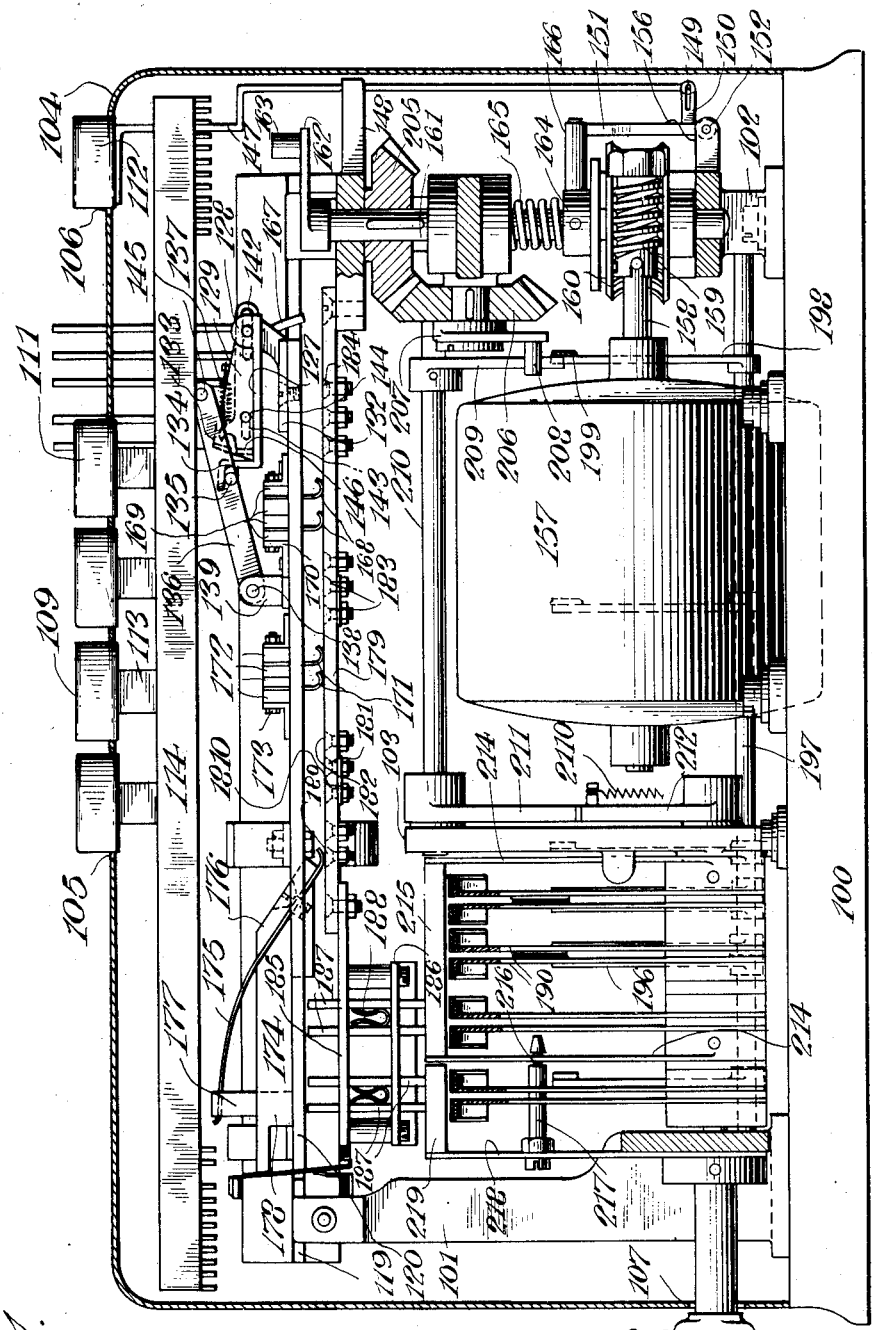
Fig. 1 is a front elevation partly in section of a machine embodying my invention.

Figs. 22A, 22B, and 22C together illustrate a typical wiring diagram for the machine, certain connections being omitted for the sake of clearness.

Fig. 23 is a diagrammatic or graphic representation of the connections effected by energizing of each digital product register magnet.

Fig. 24 is a diagrammatic or graphic representation of the connections effected by energizing of each digital multiplicand magnet.

Like characters of reference refer to like parts in all views, except that where a combination of numerical and alphabetical reference characters is used, the numerical portion refers to the part in general while the alphabetical portion refers to the particular variety. Thus 221 represents the magnets in general, while 221a represents the multiplicand magnets, etc.

Framework

Referring to the drawings in detail, and in particular to Figs. 1 to 4, the main framework of the machine will be seen to consist essentially of a base member 100 to which are secured upright side frame members 101 and 102 and an intermediate frame member 103. The frames 101, 102 and 103 run from near the front of the machine toward the rear thereof and support most of the working parts of the machine. A cover 104 is removably attached to the base 100 in any well known and desirable manner and encloses the main portion of the machine; and is formed with apertures 105 and 106 for the actuating keys, and with an aperture at 107 for a manipulative member, and with sight apertures at 108 to permit reading of the indicators, and with an aperture 1080 through which extend manipulative escapement stop elements.

Key mechanism

The keyboard, Figs. 1, 3, 4, and 5, comprises ten digit keys 109 each representing a respective one of the digits 0 to 9 inclusive, a space key 110, a total key 111, and a clear key 112, all of which are clearly shown in Fig. 5. All of these keys or key buttons except clear key 112 are secured to shanks 113 which shanks are in turn secured by riveting or other suitable means to respective bails or yokes 114. The yokes or bails 114 are U-shaped in construction with their legs running rearwardly in the machine and pivoted on a pivot rod 115, Figs. 3 and 4, supported by brackets secured to the magnet housings hereinafter described. The yokes are nested and have their front or intermediate portions running crosswise of the machine and in regularly spaced relation to each other. The yokes are supported in their upper position by suitable springs 117 and with their rearward extensions resting against stops 116.

Depression of any one of the digit keys 109, causes its bail 114 to rock down its front cross bar portion so that one end thereof depresses a respective plunger 177 and the other end operates a carriage escapement mechanism hereinafter described so that the pressure on opposite sides of the bail is about equalized thereby preventing any appreciable twisting action in the bails.

The carriage

Secured by screws or other suitable means to the front and rear of the side frame 101 and 102 and extending across the machine are rails 118 each having a longitudinal groove or way 119 cut in its inner face. Mounted in these ways 119 so as to be movable therealong is a carriage best seen in Figs. 1, 2, 3 and 4, and shown as consisting essentially of a pair of plates or strips 120 secured to each other in spaced relation by cross pieces which will be later described in connection with their specific functions.

A tension spring 121 connected at one end to a rearward extension of the carriage and anchored at the other to a stationary part of the machine, tends constantly to draw the carriage from left to right. This left-to-right movement of the carriage is controlled by an escapement mechanism which will now be described.

Figure 2:
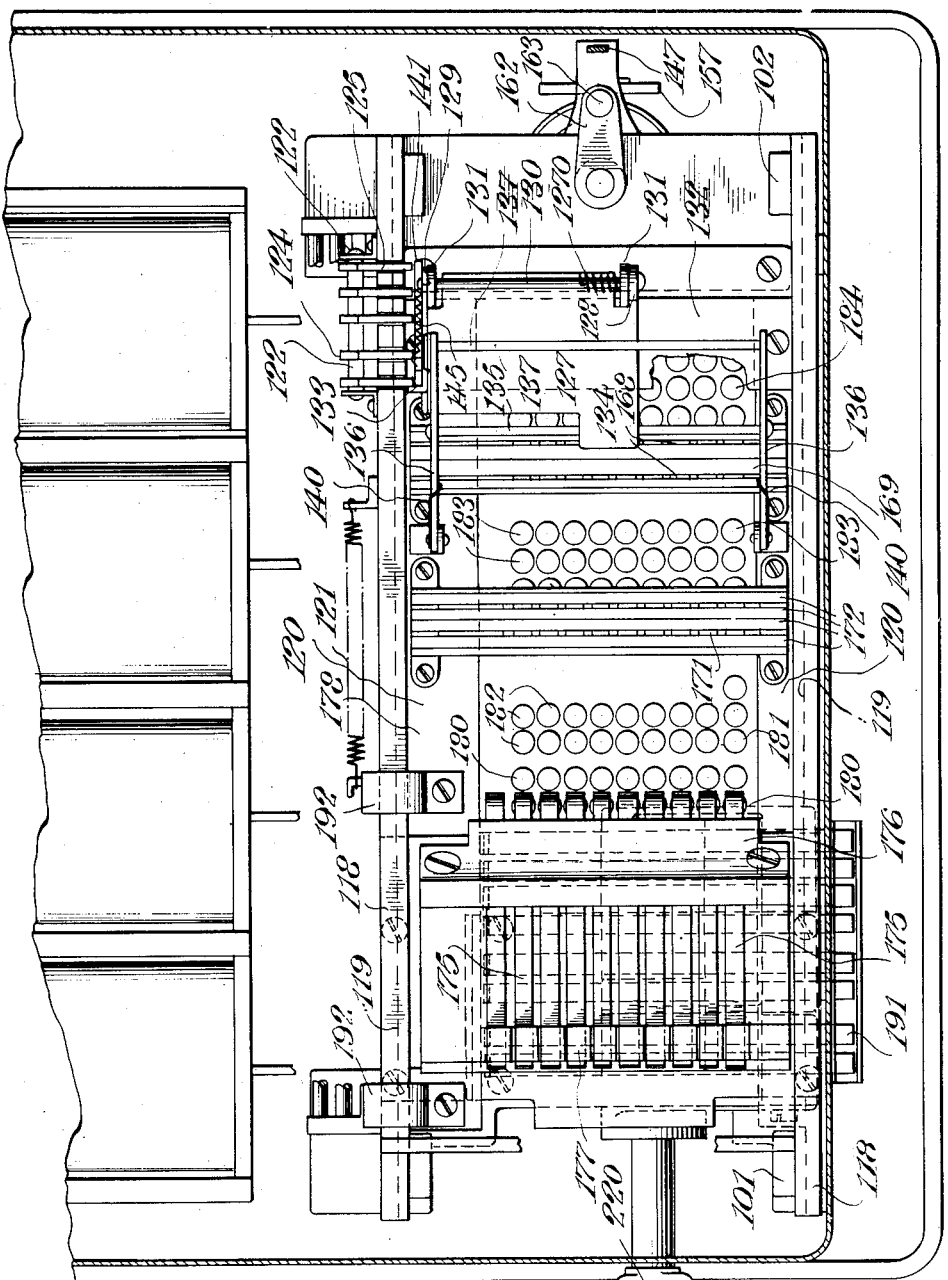
Fig. 2 is a top plan view of the same.

As shown in Figs. 2 and 4, there is a pivot rod 122 supported in brackets secured to the rear rail or bar 118. Pivoted on rod 122 is a plurality (in the present instance five) of tabulator or escapement stop members 123. Each member 123 is formed with an upwardly projecting manipulative portion 124 and a forwardly extending stop portion 125. The stops 125 extend through slots formed in the upper face of the rear rail 118, and may be moved by manipulation of elements 124 into effective or ineffective position, the aperture 1080 being of sufficient width to permit this movement.

When the stops 125 are in forward or effective position, they project into the path of movement of escapement pawls on the carriage. The main escapement pawl is a broad member 127 formed with a bent up ear 128 at its front edge and a bent up side 129 at its rear edge. A pivot pin 130 passes through the ear 128 and the side 129 and is supported in bearings in brackets 131 extending upwardly from a plate 132 which is one of the cross tie plates of the carriage frame and is secured to the carriage strips 120. The bent up side 129 also has a rearwardly projecting finger 133 for co-operation with stops 125. The left hand end of the main escapement pawl 127 is bent upwardly and to the left so as to form a finger 134 which extends over and rests upon a rod 135 of a rocking frame. This rocking frame consists of front and rear side members 136 which are rigidly secured together by the tie rod 135, a second tie rod 137 and a pivot rod 138. The pivot rod 138 is supported in bearings in brackets 139 rigidly secured to the carriage frame members 120. A spring 140 tends constantly to rock the rocking frame so that its tie rod 137 is in contact with the under surfaces of all of the yokes 114 including the total key yoke.

It will therefore be seen that the depression of any one of the digit keys 109 or the space key 110 or the total key 111 will cause the depression of tie bar 137 and rocking of the rocking frame of which it forms a part so as to lower the finger 134 and concommitantly bring the finger 133 down into the plane of the stops 125. A spring 1270 tends constantly to hold the pawl 127 with its finger 134 bearing on rod 135.

The secondary or auxiliary escapement pawl 141 is formed from a strip of metal having slots 142 and 143 formed therein. Slot 142 embraces the extended portion of the pivot rod 130, while a pin 144 secured in the turned up side 129 of the main escapement pawl 127 passes through the slot 143. A spring 145 secured at one end to an ear on pawl 141 and at the other end to a spring eye on pawl 127 tends constantly to draw the auxiliary escapement pawl toward the right. A bent over finger 146 on the end of the auxiliary pawl 141 normally (i. e., when all keys are up) extends into the plane of the stops 125 and rests against one or another of such stops. In this position the spring 145 is tensioned, for spring 121 will have moved the carriage until pin 144 stands in the left end of slot 143. Also, fingers 133 and 146 are in substantially the same arc with 130 as a center.

When a digit or space or total key is depressed, the escapement pawls will move about their pivot and eventually finger 146 will pass below the stop 125 with which it is engaged. But at the same time finger 133 will move into engaging relation with the same stop 125 and no movement of the carriage will take place. However, when the finger 146 clears the stop 125, spring 145 takes effect and moves the auxiliary escapement pawl to the right out of the plane of the stop 125 previously engaged. Upon the release of the key depressed, the pawls are moved up again by spring 140, finger 146 coming up in front of the next effective stop 125. When finger 133 rises out of engagement with its coacting stop 125, the carriage is free to move and does move, first bringing the finger 146 against the next stop 125 and then straining spring 145 until pin 144 again reaches the right-hand end of slot 143. In this manner the carriage is stepped from one denomination to another and from one register to another as will be fully understood as the specification proceeds.

Carriage return

The return of the carriage is effected by operation of the clear key 112, Figs. 1 and 4. While other operations take place as a concommitant of the return of the carriage, we shall at present consider only the restoration of the carriage itself to its left-most position.

The clear key 112, Fig. 1, is mounted on the end of an elongated stem or bar 147 which is guided by bearings in bracket 148 extending out from the stationary side frame 102 of the machine. The lower end of the clear key bar 147 is pivotally connected at 149 to an ear 150 extending toward the right from a vertically disposed rock plate 151 pivoted at 152 in bearings in brackets secured to the main side frame 102. The upper edge of the rock plate 151 is provided with a lower horizontal surface 153, an inclined surface 154 and an upper horizontal surface 155, as shown in Fig. 4. A spring 156 holds the plate 151 normally toward the left.

Mounted on the base plate 100 is a motor 157 the shaft 158 of which carries a worm 159 which meshes with a worm gear 160 loose upon a vertical shaft 161 mounted in bearings formed in the side plate 102. Pinned to the upper end of the shaft 161 is a carriage return arm 162 carrying a roller 163. A clutch disk 164 is pinned on shaft 161. This clutch disk 164 is constantly urged in a downward direction by a spring 165. The clutch disk 164 carries a roller 166 which normally rests on the upper horizontal portion 155 of the rock plate 151. With the roller 166 on this high portion of the plate, the clutch disk is held out of clutching relation with the worm gear 160. When the clear key 112 is depressed the plate 151 is thereby rocked until its upper edge clears the end of the roller 166 whereupon the clutch disk is permitted to move downwardly under impulse of its spring 165 until it frictionally engages the upper surface of the worm 160. The worm gear now causes rotary movement of the clutch disk 164 which in turn transmits its motion to the shaft 161. By this means the roller 163 is caused to travel in a circular path and during its movement it first strikes a tail 167 depending from the escapement pawl 127 and rocks both of the escapement pawls until finger 146 is clear of the escapement teeth 125. At this time the tail 167 abuts against the cross bar 132 and further movement of the roller 163 pushes the carriage towards its leftmost position. When the carriage has been pushed to its leftmost position the fingers 133 and 146 are an appreciable distance beyond the leftmost stop 125. Further movement of roller 163 causes the same to ride off the tail 167 permitting the escapement pawls to return to their normal position and as the roller 163 continues its movement the carriage moves back slightly toward the right until the finger 146 engages the first effective escapement stop 125. When the roller 163 rides off the tail 167 it then contacts the bar 132 so as to control the movement of the carriage toward the right. As the shaft 161 continues its movement the roller 166 rides onto the lower horizontal face 153 of the plate 151 which has by this time been returned to its normal position by its spring 156, and then rides up the incline 154 onto the high surface 155, thereby moving the clutch disk 154 out of engagement with the worm gear 160. This full movement up onto 155 is insured by a spring 2110 as will be later set forth. Should the clear key inadvertently be held depressed the roller 163 will be actuated for several revolutions but no damage will be caused and there will be but a slight back and forth movement of the carriage the extent of which movement will be determined by which of the stops 125 is effective.

Carriage contactors

The carriage carries several series of contactors or brushes the main features of which will now be described, and are best seen in Figs. 1 and 2.

Two series of brushes 168 are provided for the "lower-digit" product register, which will later be described. Each series of brushes 168 comprises nine brushes, and the machine has as many series of these brushes as there are to be digits in the largest multiplier which the machine is designed to handle. The machine as here illustrated is designed to handle a two digit multiplicand and a two digit multipler—i. e., the machine has a capacity of 99 times 99. If the machine is to be designed for a greater capacity, then the number of series of brushes 168 will have to be increased in accordance with the increased number of denominations of capacity. The brushes 168 are in the form of metallic springs pressed between strips 169 of insulating material the whole clamped together by metallic strips 170 secured to the carriage frame and forming one of the cross tie members thereof. The upper ends of the several brushes 168 are connected to respective leads put together in a cable sufficiently flexible to permit movement of the carriage, such cable leading to parts which will later be described. In like manner, series of contact brushes 171 for the "upper-digit" product register are confined between insulating strips 172 by metallic strips 173 secured to the carriage frame bars 120 and forming another cross tie member therefor. A block of insulating material 174 is secured to the carriage members 120 and forms a cross tie therefor. The block 174 has an inclined right hand face formed with grooves in which are seated a series of ten spring contact brushes 175. The contact brushes 175 are firmly secured in place against the inclined face of block 174 by a strip of insulating material 176 secured to the block 174 by screws. The lower ends of the brushes 175 project downwardly to form brushes, and the upper ends of the members 175 project upwardly above block 174 and toward the left to form springs for a purpose which will now be described.

Figure 3:
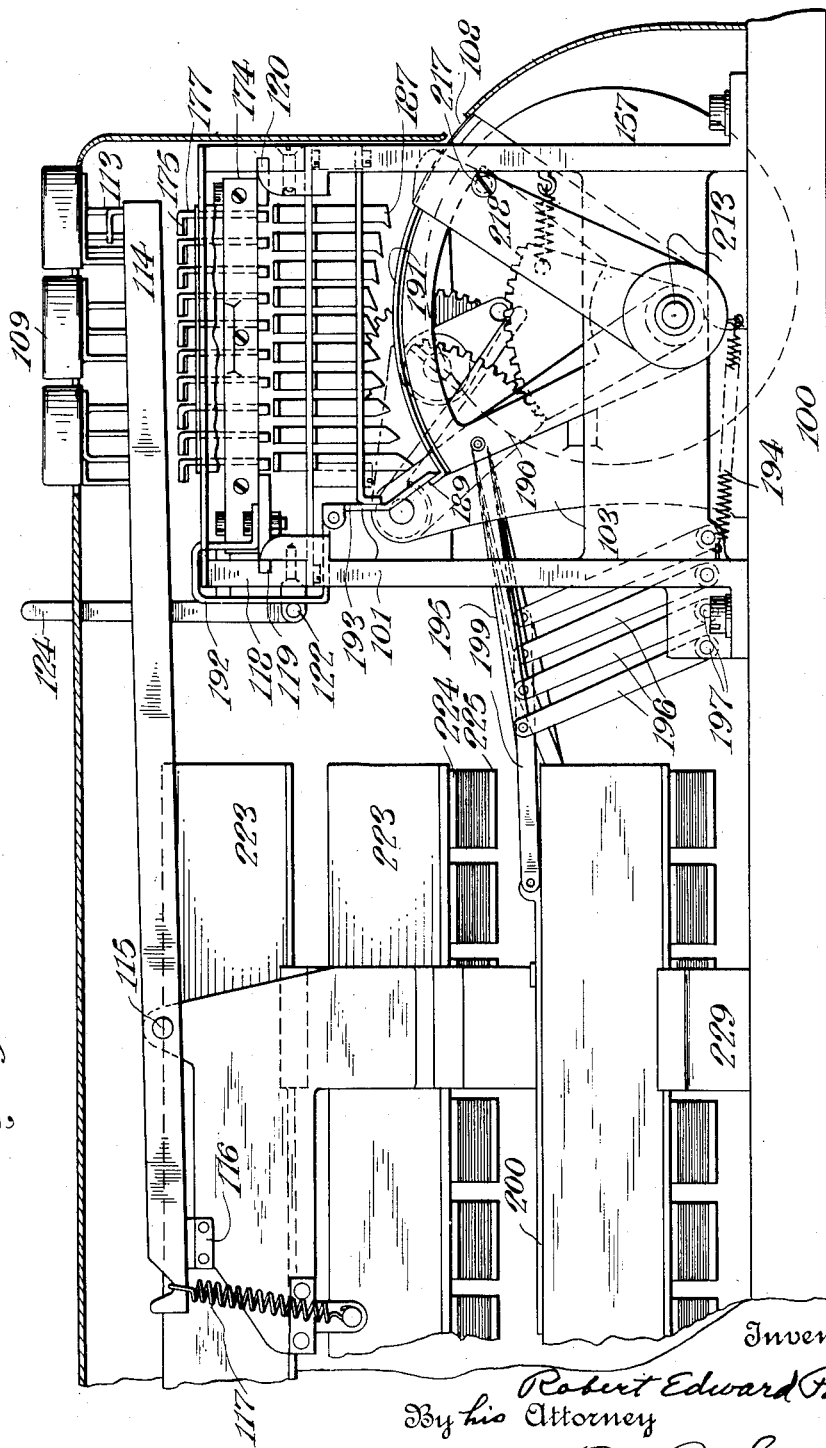
Fig. 3 is a fragmentary left end elevation of the same.
Figure 18:
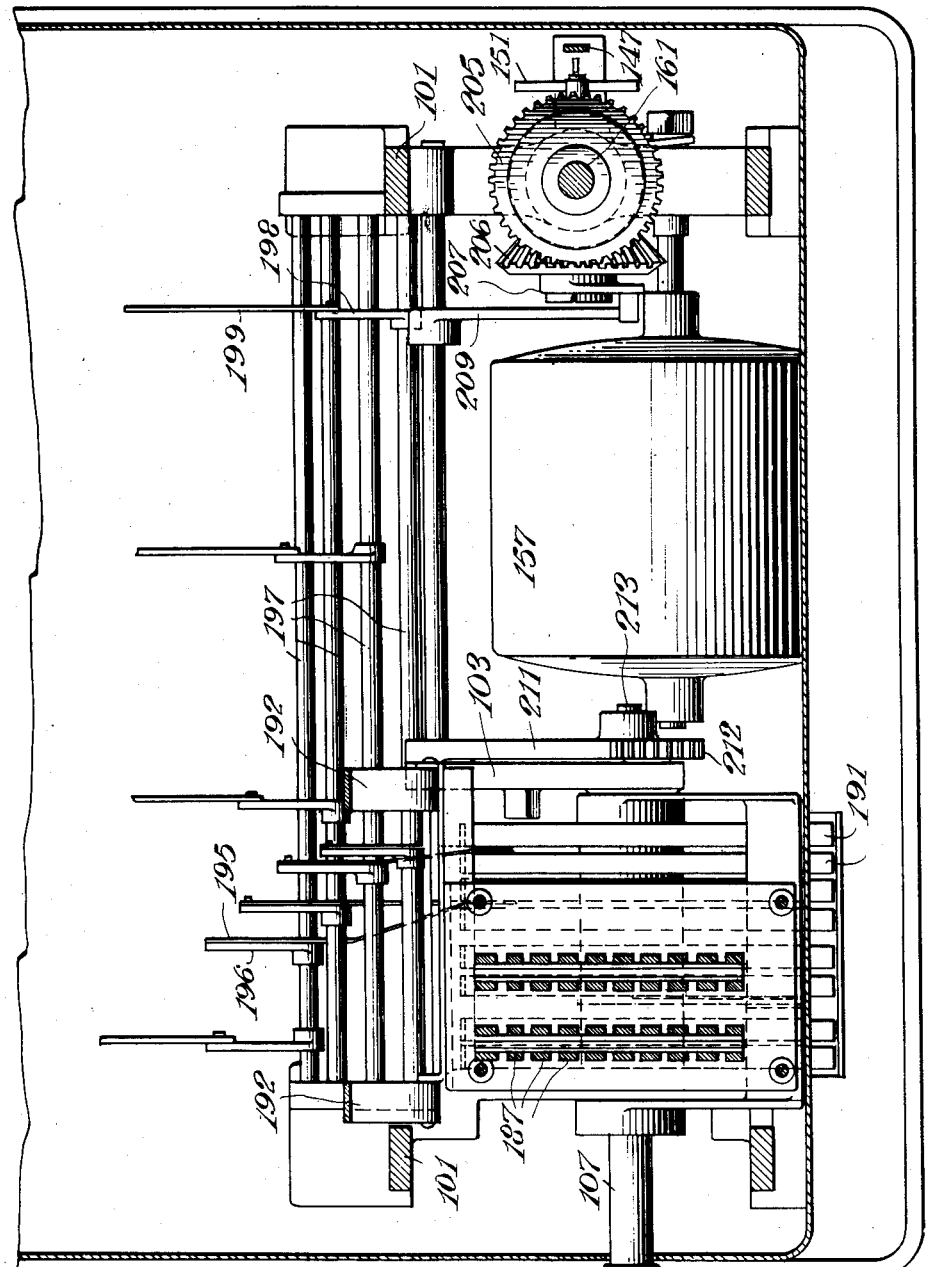
Fig. 18 is a top plan view showing the indicator connections.

Mounted in slots formed in the left hand portion of the block 174 are ten plungers 177, Figs. 1 and 3, each corresponding to one of the ten digits 0 to 9, inclusive, and each arranged so that its upper bent over end is under the front or cross portion of the respective digit key yoke 114. The upper end of each spring contact member 175 rests under the upper bent over portion of a respective plunger 177 tending constantly to hold said plunger in its uppermost position. The extent of upward movement of the plungers 177 is controlled by the lower bent over ends of said plungers contacting the bottom of block 174. All of the plungers 177 are retained in the block 174 by a strip 178 of insulating material secured to the left hand face of the block 174.

A contact plate 179 of insulating material is supported at one side by the machine frame and the other side by a stationary plate 185 mounted under rails 118; and carries a plurality of series of multiplier contacts 181 and a total contact 182 which co-operate with the brushes 175. No contacts are provided for co-operation with the zero brush 175 as operation of the zero key merely steps the carriage and controls indicators and effects no adding or multiplying. The contacts 181 of each series are connected by members 1810 with corresponding contacts of all the other series of contacts 181.

The brushes 171 are adapted to contact denominational series of contacts 183 connected to the "higher-digit" register as will be later explained; and the brushes 168 are adapted to engage contacts 184 of the "lower-digit" register. There are nine brushes 171 and nine brushes 168 for each denominational series and likewise nine contacts 183 and nine contacts 184 for each denominational series.

Indicator mechanism

Means are provided for indicating the multiplicand, the multiplier, and the product or in the case of addition, the total accumulated at each operation—see Figs. 1, 2, 3, 4, 6 and 7.

Mounted in the stationary frame plates 185 and 186 are a plurality of series of stops 187. These stops are slidable vertically in the plates 185 and 186 and are held in either their upper or lower positions by U-shaped springs 188. When the carriage is held by the left-hand stop 125 the plungers 177 are in position over the left hand series of stops 187, all of the stops 187 being normally in upper position. When a plunger 177 is depressed by the depression of the respective digit key it moves the respective stop 187 to its lowermost position. Movement of the carriage brings the series of plungers 177 over the several series of stops 187 seriatim so that a stop in one series after another may be set up. Inasmuch as the embodiment here shown is adapted only for numbers with a multiplicand and multiplier of two digits each, there is shown only two series of stops for the multiplicand and two series of stops for the multiplier. The two series of stops 187 at the left hand are the multiplicand indicator stops and the two series of stops 187 at the right are the multiplier indicator stops. When a stop 187 is in its lowermost position its lower end is extended into the path of travel of a finger 189 on a denominational sector 190 which carries an indicator strip 191 adapted to be viewed through the sight apertures 108, and which bears digital indicia 0 to 9, inclusive.

Mounted on the rear carriage strip 120 and bent so as to extend first upwardly then rearwardly then downwardly and then forwardly about the rear rail 118 are a pair of supporting members 192 which pivotally support at their lower ends a shutter or swinging plate 193. This plate is normally limited in its forward movement by the rear end of the supporting frame 186 and normally has its lower end in the path of movement of the fingers 189 of all of the indicator sectors 190. When the carriage moves from left to right it carries with it the shutter 193 which at each step of the carriage releases one of the indicator sectors 190 so that the latter may move forward under the impulse of a light spring 194 and gravity until it has brought its finger 189 into contact with the set stop 187 of its particular row. After all of the series of stops 187 have been traversed and their sectors released, the next movement of the carriage toward the right (caused by depression of the total key) causes the swinging plate 193 to escape from the right hand end of the frame member 186 and all of the remaining sectors 190 are permitted to move forward. By reference to Fig. 1 it will be seen that there are four sectors which have no associated stops 187. These are the four sectors 190 toward the right in the machine and their purpose is to indicate the total or product. The extent of movement of the four sectors 190 is controlled by means which will now be described.

Each of the four sectors 190 to the right, which sectors are utilized to indicate the product or total, has one end of a link 195 pivotally secured to it, the other end of the link being pivotally secured to one end of an arm 196 fast on a rock shaft 197. A second arm 198, also fast on rock shaft 197 is pivotally connected to one end of a link 199. The other end of link 199 is pivotally connected to one end of a slide member 200 mounted on a magnet housing of that denomination of the "lower-digit" register corresponding to the denomination of the sector 190 with which it is connected. There is a separate shaft 197 for each of the product sectors 190, all of these shafts being mounted in bearings in the side frames or in any other suitable manner. The slide members 200 are provided with slots 201 through which pass headed pins 202 so that the several slide members 200 are permitted a limited amount of longitudinal movement but are held against any other movement. Each of the slide members 200 is formed with five teeth or stops 203, each of which stops is adapted to be controlled by either of a pair of pins 204. There are ten pins 204 for each slide member 200, each stop 203 co-operating with only two of such pins. For instance, one of the stops co-operates with the 0 and 5 pins, the next with the 1 and 6 pins, the next with the 2 and 7 pins, etc. Each pin 204 is adapted to be moved up into operative position by the armature of the respective magnet of the respective denominational series of magnets of the lower digit register; and when moved into operative position will cause the correlated sector 190 to display the respective digit at the sight opening. Description of the magnets and mounting will be given in full hereinafter.

Indicator return

It is necessary after the multiplier, multiplicand and product have been indicated that all of the indicators should be returned to their normal position. Means are provided for this purpose, as best shown in Figs. 1, 2, 4, and 18, and will now be described. Pinned on the shaft 161, which it will be recalled, is rendered active upon depression of the clear key, is a mitre gear 205 which meshes with a mitre gear 206 mounted on a stud, fast in the side frame 102. Secured to the mitre gear 206 in any desired manner, as for instance by a sleeve and hub pinned thereon, is a disk 207 carrying a roller 208. The roller 208 extends into the plane of a rock arm 209 which is secured by a hub and pin to a rock shaft 210 having bearings in the frame members 102 and 103. Pinned on the rock shaft 210 near its left end is a gear segment 211 which meshes with a gear segment 212 pinned on a shaft 213 having bearings in the frame members 101 and 103. Pinned to the rock shaft 213 is a pair of rock arms 214, which arms at their upper ends carry a bar 215 of wedge-shape cross section. This bar 215 extends across all of the product and multiplier dials, in this case, the six dials towards the right. The left-hand rock arm 214 is formed with an aperture 216 through which passes a pin 217 secured at its other end to a rock arm 218. The rock arm 218 is mounted on a sleeve which is slidably supported by rock shaft 213, and is provided at its upper end with a bar 219 which is also of wedge-shape cross-section and extends over the multiplicand dials. A finger piece 220 is secured to the sleeve of rock arm 218 and may be drawn to the left in Fig. 1 so as to withdraw pin 217 from the rock arm 214.

When the clear key is operated and shaft 161 rotates, the latter carries with it the gear 205 which controls gear 206 and its disk 207. In this manner the roller 208 rides against the arm 209 so as to rock the same, thereby causing gear segment 211 to rock gear segment 212 and shaft 213. Shaft 213 in turn rocks the arms 214 and their cross bar 215 and if pin 217 is engaged in the aperture 216, arm 218 and cross bar 219 will also be rocked. Upon the rocking rearwardly of the cross bars 215 and 219 the upper surfaces of said cross bars return the said stops 187 to their upper position and the front edge of the bars 215 and 219 pick up the fingers 189 of all of the dial segments 190 and move them rearwardly until they are in rear of the swinging shutter 193. As the operation continues the parts are rocked back to normal by a spring 2110 secured at one end to the segment 212 and at the other to a pin on a stationary part, and as the carriage is returned to its leftmost position all of the sectors will be engaged by and held in position by a shutter 193. It may at times be desirable to retain the multiplicand dials in set position for several operations, as for instance, where a constant is involved in several succeeding computations, and in this case the knob 220 is pulled out so as to disengage pin 217 from the aperture 216. In this case rock arm 218 and cross bar 219 will not be operated and the multiplicand will remain set up on the multiplicand dials. In a case such as that just mentioned, the left-most two stops 125 are moved to their inactive position so that after the carriage has been returned to its left-most position it will be permitted to move back to the third stop 125 in which position it is ready to set up the highest digit of the multiplier. The stops 125 may also be rendered ineffective when it is desired to skip a column or columns of the multiplier particularly in high capacity machines.

Magnet mountings

This machine includes a number of magnets and relays. These magnets and relays are, for the most part divided into groups, each group comprising a plurality of series each series being assigned to a respective denomination of its group or register. Means are provided for supporting each denominational series of magnets and relays as a unit and for suporting the several units in convenient and compact relation to each other and to the other portions of the machine.

As shown in Figs. 6, 7, 8, 9, 20 and 21, the magnets are indicated generally by the numeral 221 and the relays by 222. Specific reference characters will be given the several magnets and relays when their specific functions are discussed. The magnets and relays of any one series or denomination are all secured in a housing member or trough 223 of inverted U-shaped formation, the magnets and relays being secured against the upper inner surface of the member 223. The lower portion of member 223 is bridged by plates 224 to which are secured plates 225. Between the pair of plates 224 and 225 for each magnet is secured a plurality of strips 226, some of which have spring contactor fingers 227 extending upwardly and over plate 224 and supporting the respective armature 228 which armature consists of two plates. The construction and arrangement of these strips 226 will be presently described in detail. It will now be clear that each housing 223 with its plates 224 and 225 forms a unitary structure for supporting a denominational series of magnets and relays; with their armatures and connections and that the entire denominational set of magnets may be assembled as a unit and then introduced into the machine.

Supporting members 229 are secured to the base plate 100 and extend upwardly therefrom. Members 229 are formed with oppositely facing C-shaped bends 230 whereby the several units or denominational sets of magnets may be supported as shown in Fig. 20. As shown there are three sets of these bends so that three tiers of magnets are supported in superposed relation; and each support 229 except the outer ones helps support one set of magnets with the bends opening at one side and another set with the bends opening on the other side. In this manner I am able to support a number of magnets and relays in a very small space.

It may be well at this point to digress for an instant to state that the slides 200 hereinbefore mentioned are secured on top of the housing 223 of the lowest tier of magnets and the pins 204 are guided in holes in this housing and in strips 231 carried by the numeral magnets of this tier. The pins 204 are secured to or rest upon respective armatures 228, by which they are raised into the path of fingers 203.

Magnet and relay contacts

Each of the magnets 221 and relays 222 is adapted when energized to cause a plurality of contactors to move into engagement with respective contacts, and as a relatively large number of contactors may be operated by certain of said magnets and relays, there has been devised a very simple and compact construction for the contacts and contactors. The number of contactors operated by the several magnets and relays varies according to the number of circuits over which each must exert a controlling influence. The construction and arrangement of contacts and contactors for typical magnets and relays will be specifically described it being understood that all are similarly constructed, differing only in the number and arrangement of parts.

Referring particularly to Figs. 6 to 17 and 19 and 20, it will be seen that for each magnet 221 and relay 222 there is provided a plurality of strips 226. There are four types of these strips and all strips are formed with tongues or fingers. The fingers for the contactors are all indicated by the numeral 227 which fingers as already stated are bent upwardly and inwardly so as to resiliently support the armature 228 of the respective magnet or relay and these spring contactors 227 extend beyond the armatures so as to be brought into engagement with respective contacts when necessary. Certain of the strips 226 are formed with contact fingers 232 which are bent upwardly at the side of the pile of strips 226 opposed to that at which the contactor fingers 227 are bent up. The upper ends of fingers 232 are bent inwardly to form contacts to be engaged by respective contactors. Certain of the strips 226, Fig. 12, are formed with a plurality of contacts 232 so as to be engageable by a plurality of contactors; but these are used only in the multiplicand register. The other forms of strips 226 comprise what I term the "carry" and "nocarry" strips and are respectively formed with fingers 233 and 234. These fingers 233 and 234 vary in width for the several digit magnets, so as to engage from one to nine contactors according to the digital value of the magnet.

The strips 226 are insulated from each other either by a coating of insulating material or by a sheet of insulating material attached to the surface. In Fig. 10 the blanks for the contactors 227 and for those contacts formed by fingers 232 are shown. It will be seen that the contactor and contact fingers 227 and 232 are arranged at spaced intervals on their strips 226 so that a number of the fingers may be bent up in the same vertical plane without interfering with each other. By reference to Figs. 13 and 15 it will be seen that I bend all of the contactors 227 of one magnet up in two vertical planes and then bend them in, in parallel relation to support the armature 228. The contacts 232 are also bent up in two planes and then inwardly to position for engagement with respective contactors 227; and the contacts 233 and 234, Fig. 11, which are always complemental, are bent up in a single plane, which is one of the planes of contacts 232, and in to position for engagement by the respective contactors 227. The portions of contactors 227 and contacts 232, 233 and 234 which are adapted to engage for controlling circuits have the insulating material removed.

In order to readily assemble the strips 226, they are formed with apertures 226a and each of the plates 224 is provided with depending pins 224a upon which the plates 226 may be readily and quickly assembled. This construction is best shown in Figs. 10, 11, 12, 15, 16, and 17.

Inlet and outlet connecting bars 235 and 235a are arranged between the ends of strips 226 of each denomination and the insulation of such strips as should be interrelated is removed so as to permit current to flow through said bars 235, 235a either to or from all of the strips 226 with which each bar 235, 235a is connected. Thus all of the "0" strips 226 of a denomination are connected in parallel by a bar 235; all of the "1" strips of a denomination by another bar 235, etc. The purpose of this will become apparent as the description proceeds.

Having described all of the mechanical details of the machine, the theory of operation will now be discussed, after which the electrical operations will be set forth.

If we take the problem 59 multiplied by 37 we have, in ordinary multiplication 7 times 9 equals 63 as our first operation followed by 7 times 5 equals 35 which must be set one place to the left and have the 6 of the preceding operation added in to make the partial product 413. In multiplying through by the 10's multiplier 3 we have 3 times 9 equals 27 the second or lower digit of which goes in the tens column; 3 times 5 equals 15 plus the 2 of the previous operation making 17, the digits of which go in the thousands and hundreds columns, respectively. We then add the partial product 413 and 177(0) which together form the product 2183. In multiplying as above at each operation we have had 2 figures or digits and these might be tabulated separately and added like this.

```
      59
      37
     ---
      63
      35
      27
      15
     ---
    2183
```

It will now be obvious that we could start multiplying first by the 3 and then by the 7 and by arrangement of the partial products in the proper decimal positions, our added products would give the correct result or final product.

Let us now consider that we separate each of these initial products into its digits, placing one digit at one side and the other digit at the other side and then adding our digits into two partial products, these partial products then being added together to form our final product, we would have as follows if we multiplied first by the left hand or higher order digit of our multiplier:

```
    1       5
    2       7
    3       5
    6       3
   ---     ---
   156     623
           156
          ----
          2183
```

This last form indicates the manner in which the present machine effects multiplication. The 59 would be set up and then when it was multiplied by the 37 the lower digit of each partial product would be entered in the proper denomination of one register and the upper digit in the proper denomination of another register.

In the present instances these registers comprise armatures and co-operating electro-magnets and after they have been operated to form a preliminary representation of the partial products, the electro-magnets of one register are caused to control those of the other register so as to add the partial products together on the second register; and then the electro-magnets of the second register are caused to control indicators for indicating the answer or complete product.

Generally speaking, the device includes a plurality of sets of armatures and electro-magnets upon which a multiplicand my be set up, there being one set for each denomination of the multiplicand. There are also two product registers each of which comprises a plurality of sets of armatures and electro-magnets. One of these product registers has a set of armatures and electro-magnets for each denomination of the product, and the other has a set for each denomination of the product except the lowest. This second product register may be connected with the first product register for adding to the latter the partial product registered in the said second partial product register.

*The multiplicand register*

Referring first to the multiplicand register, it will be seen (Figs. 20 and 22B) that there are a plurality of rows of electro-magnets 221a, each provided with an armature 228, which armatures stand open or away from their magnets when the machine is in normal or cleared condition. Each row or set of magnets 221a, consists of nine magnets representing, respectively, the digits 1 to 9. All of the magnets are permanently grounded in any desirable manner, for instance, as indicated in the drawings by connections 242 to the negative lead 236.

The motor generator or other source of electric power is indicated at 237, and is provided with negative and positive leads 236 and 238.

The key yokes 114 of the digit keys "1" to "9", inclusive, and of the total key are connected by a lead 239 to a line 240 from the positive lead 238.

It will be recalled that when any digit key is depressed, its bail or yoke 114 presses down on a respective metallic plunger 177 which is in contact with a respective spring brush 175, Fig. 1. Also, when the carriage is in normal position all of the brushes 175 of the significant digits are in engagement at their lower ends with the left-most series of multiplicand contacts 180. As shown in Fig. 22B, this left-hand series of contacts 180 is connected by leads 241 with respective magnets of the highest denominational row of magnets 221a. There are nine of these magnets 221a for each denominational row, but in Fig. 22B only three are shown they being the "2", "5" and "9" magnets. This omission of the other magnets and their connections has been made to avoid confusion, as the omitted magnets and connections are similar to those shown but with connections corresponding to their respective digital values.

Considering for a moment the purpose of this multiplicand register, it may be stated that broadly its purpose is to close connections of circuits corresponding to the digital value of the respective magnets multiplied by each of the digits "1" to "9". Thus the "1" multiplicand magnet must, when energized, cause the closing of connections in circuits corresponding to the partial products 1, 2, 3, 4, 5, 6, 7, 8, and 9; while the "2" multiplicand magnet must control circuits corresponding to 2, 4, 6, 8, 10, 12, 14, 16, and 18; etc. In other words each denominational row of multiplicand armatures and magnets includes a possible preliminary representation of all the products from 1×1 to 9×9, inclusive, or a complete single-digit multiplication table.

Returning now to the leads 241, these connect with respective magnets of the highest denomination of multiplicand magnets; and when a significant digit key is depressed, the respective magnet 221a of the highest denominational row of magnets is caused to attract or close its armature 228, thereby bringing the contactors 227 of this armature into engagement with the corresponding contacts 232 therefor. There are no contacts 233 and 234, because the multiplicand register is merely a preliminary representation device and carrying or "tens-transferring" never takes place.

Each armature 228 of a multplicand magnet 221a carries a plurality of contactors 227 which, when the magnet is energized, engage respective contacts 232. One of the inlet contactor bars 235 of each denomination is connected to a lead 243 from the positive main lead 238 and when its contactor 227 is in engagement with the respective contact 232, sends current through its respective magnet so as to hold the armature in its active or closed position after the respective key is released. The circuit thus closed through the magnet is a holding circuit since it is a means controlled by the magnet to retain the magnet energized, thereby holding the armature to represent the amount registered. Each of the other inlet contact bars 235, of which there are eighteen, connects to a respective strip 226 carrying a contactor 227. There are eighteen inlets 235 because there must be a possibility of closing respective digital leads to the "upper-digit" product register and respective digital leads to the "lower-digit" product register.

The contacts 232 for a multiplicand magnet correspond in number to the number of contactors 227 and are formed on strips 226 corresponding to the digits which they are to represent. Thus, the contacts 232 for a "1" magnet are connected to respective strips since they represent digits "1" to "9" for the "lower-digit" register only. On the other hand, for the "5" magnet, all of the lower significant digits are 5's while the higher significant digits are two 1's, two 2's, two 3's and two 4's. Therefore of the contacts for the "5" magnet, five will be connected with a "5" strip for the "lower-digit" product register, and two with each of the "1", "2", "3", and "4"-strips for the "higher-digit" product register.

The strips 226 carrying contacts 232 for any one digit of the "lower-digit" product register connect with a single outlet bar 235a; and similarly, those for any one digit of the "higher-digit" product register connect with a single outlet bar 235a.

As previously described, the carriage moves so as to bring the brushes 175, Fig. 1, into contact with one after another of the series of contacts 180, beginning with the highest order so that the respective digits of the multiplicand may be represented in the field of multiplicand magnets by the energizing of respective magnets thereof. When the units or lowest order of the multiplicand has been set up, the carriage steps the spring brushes 175 onto the contacts 181 with which they engage during the depressing of the keys for the multiplier. At the same time that the brushes 175 move onto contacts 181, the two sets of brushes 171 are moved onto the two highest series of contacts 183 for the "higher-digit" product register, and the two sets of brushes 168 move onto the two highest sets of contactors 184.

*The product registers*

Turning now to the product registers, there are two of these which for want of better terms, I call the "upper-digit" product register and the "lower-digit" product register, since the former receives all of the higher digits of the partial products, and the other, all of the lower digits of the partial products. In Figs. 20 and 22A, the "upper-digit" register is shown as comprising three sets of armatures with their magnets and relays and in Figs. 20 and 22B and C the lower-digit register is shown as comprising four sets of armatures with their magnets and relays. This, of course, is illustrating a machine of 99×99 capacity. If a larger number of orders is required, a sufficient number of sets of magnets and relays will be included to take care of the product.

Each of the two product registers includes a plurality of series of electro-magnets, each series being identified with a specific denomination. The "upper-digit" register has one less series of magnets than the "lower-digit" register, as the "upper-digit" register never receives a digit of the same order as the lowest order of the "lower-digit" register.

Each of the series of magnets and relays in each product register consists of a plurality of digit relays 222b and a plurality of main registering digit magnets 221b. Besides these relays and magnets, each series other than that of highest order in each register, is provided with a "carry" or tens-transfer magnet 221c (the purpose of which is to effect the actual carrying or transferring of one to the next higher denomination); a "carry" relay 222c (the purpose of which is to set for a carrying operation); a "no-carry" relay 222d; an "add-carry-set" magnet 221e (to render the adding and "carry-set" circuits alternatively effective); a release relay 222f; and an "cut-offcarry" magnet 221f. The highest denominational order of each register includes only digit relays and magnets 222b and 221b; and a "cut-off" magnet 221g (which performs only one of the functions of magnets 221f) of the other denominations.

In Figs. 22A, 22B, and 22C, only the "0", "1", and "9" digit magnets have been shown in the product registers, so as to avoid confusion. Since the units or lowest denomination of the "lower-digit" register has the greatest number of connections, and all other denominations are substantially similar but with some connections omitted, this lowest denomination will be specifically described.

Normally the magnet 221f is energized by a holding circuit comprising a lead 244 to the negative line 236, and a lead 245 which has a connection to a contactor 227 of each of the digit magnet armatures. The lead 245 has also a double-contact switch 246 at every digit magnet armature, such switch being operable by the armature of the respective magnet, so that this holding circuit is closed when all associated armatures are in either extreme position but is broken while any of these armatures is passing from one position to the other. Lead 245 connects to a lead 247 to positive line 238. A lead 248 also connects to lead 245 and connects to a contactor 227 for each digit relay 222b and is provided with a switch 246 at each relay 222b and controlled by the armature thereof. All of the relays 222b are grounded on a lead 249 to 236. These connections form the holding circuits for the several digit magnets and relays and it will be seen that when any digit relay is energized, the holding circuit for all digit relays is momentarily broken thereby releasing any other digit relay previously active, and then the circuit is again closed holding the newly energized relay active, also the energizing of any digit magnet will release any previously energized digit magnet as well as magnet 221f and relay 222d of the denomination, and the newly energized digit magnet will be held energized.

As before stated the magnet 221f is normally energized, and at this time the "0" relay and "0" magnet 222b and 221b are also energized and held by their holding circuits. The armature of magnet 221f carries nine contactors 227, as well as a holding circuit contactor, and these nine are connected to leads 250 from the respective denominational contacts 184 (or in the case of the "higher-digit" register, contacts 183).

Carry or transfer determining

There are also nine contacts 232 for the magnet 221f which are respectively connected by leads 251 to contactors 227 on the armature of the "add-carry-set" magnet 221e. These contactors normally (i. e., when the magnet 221e is deenergized), stand in engagement with nine contacts 232 connected to strips 226, of what I term "carry-determining" circuits. The leads from these contacts are indicated at 235c and each lead 235c is connected to a respective strip 226 for each of the digit magnet armatures of the particular denomination. Thus there is a "carry-determining" lead 235c for each of the nine significant digits; and each lead or bar 235c has a respective contactor on each of the armatures of the digit magnets of that denomination, including the "0" magnet armature.

It will be seen that if any digit line 250 is rendered "live," current will pass to the respective contactor 227 at magnet 221f, then from the engaged contact 232 to the respective contactor on the armature of magnet 221e and as this armature is then open, current will be transferred to the respective "carry-determining" bar 235c. As the armature of the "0" digit magnet is closed at this time, current is conducted to the contactor 227 thereof which is connected with the "live" bar 235c and passed thru the engaged "no-carry" contact 234 to the "no-carry" lead 252. As any digit added to zero gives the digit, there will never be a carry to the next higher order when any order standing at zero has any digit added to it. Consequently, all "carry-determining" contactors of the armature of the zero magnet are adapted to contact the "no-carry" contact 234.

When current is passed thru "no-carry" lead 252, it flows thru the "no-carry" relay 222d grounded to the lead 249. This relay 222d attracts or closes its armature, which has only two contactors. One of these is connected with a lead 253 from the lead 245 of the holding circuit for the digit relays and magnets. The corresponding contact 232 is connected with the positive side of relay 222d so that when the armature of 222d is in closed position, a holding circuit for this relay is formed thru leads 245 and 253 and the associated contactor and contact to the relay and ground 249.

The armature of relay 222d also carries a contactor connected to a lead 254 from the outlet side of the magnet 221e. The contact 232 for this contactor is connected to the negative lead from 222d to the ground lead 249 so that when relay 222d moves its armature to closed position, a circuit is closed through magnet 221e thereby energizing this magnet which draws its armature over until its contactors 227 engage contacts 232 connected to "add" leads or inlet connecting bars 235.

Thus far we have seen what happens where no carrying is to take place. Let us now see what takes place in the "carry-determining" when a carry operation is to be effected. Presume that the "1" magnet stands closed and that current is passed thru the "9" lead 250. The current passes to the "9" contactor 227 at magnet 221f, thence thru the respective contact 232 to the respective lead 251, to the respective contactor on the armature of magnet 221e, thru the respective contact to the "9" carrying-determining connecting bar 235c. As the "1" armature is the only digit armature in closed or attracted position, the current passes to a respective contactor 227 of this armature and to the carry contact 233. Inasmuch as one plus nine make ten, a carry must be indicated, and for this purpose, the contact 233 connects to a "carry" lead 256. This closes the circuit thru a resistance R to the "carry-set" relay 222c also grounded by lead 249. The armature of relay 222c carries two contactors 227 which engage respective contacts one of which connects as indicated at 255 through a resistance RT to the positive or inlet side of the "carry" magnet 221c, and the other to the "carry-set" relay 222c. The contactors of this armature of relay 222c are respectively connected to leads 257 and 258. Lead 258 passes to a contact normally in engagement with a contactor on the armature of relay 222f. This armature normally stands open, and in this condition completes the circuit from 258 thru a lead 259 to the "add-carry-set" magnet 221e, so that when the armature of 222c is moved to its attracted or closed position, a circuit is closed which acts as a holding circuit for the relay 222c and also energizes magnet 221e to draw its armature to "add" or closed position.

It will thus be seen that when it is determined that no carry is to take place, relay 222d is energized; and when a carry is to take place, relay 222c is energized; but in either case a circuit is closed thru the "add-carry-set" magnet 221e so as to shift the contactors of its armature into engagement with the contacts of the "add" leads or bars 235.

The passage of current thru any lead 250 effects three operations, which are in order: (1) Carry or transfer determination—i. e., whether upon adding the digit represented by the live lead 250, a carry must be effected into the next higher denominational order; (2) Adding of the digit represented by the live lead 250; and (3) Actual carrying to the next higher order if carrying is to occur. The first of these operations has been discussed, and now the second will be set forth.

*Adding*

The shifting of the armature of the magnet 221e by the energizing of magnet 221e at the end of the carry-determining operation, brings all of the leads 251 into circuit with their respective "add" connecting bars 235. Each of these connecting bars 235 is connected to a respective strip 226 for each digit magnet 221b, each of such strips carrying a digit contactor 227 secured to the respective armature. There is also provided at each digit magnet a digit contact 232 for each contactor 227, such contacts having their strips 228 connected to one or another of the digit outlet connecting bars 235a. There are ten of these outlet bars 235a for each denominational order, each assigned to one of the ten digits. The one of these bars 235a to which any strip 226 carrying a digit contact 232 is connected, is determined by adding the digit represented by the lead 250 to the digit represented by the digit magnet 221b. Thus, the "1" to "9" contactors at the "0" magnet engage respectively with contacts connected to the "1" to "9" leads 235a; while the "1" to "9" contactors at the "5" magnet engage respectively with contacts connected to the "6", "7", "8", "9", "0", "1", "2", "3", and "4", leads 235a. In the addition of a five to the digit represented by the "5" magnet, five plus five makes ten, so that a carry is indicated and the zero lead 235a is utilized to effect representation of the zero of the "10". The leads 235a are connected respectively to corresponding digit relays 222b—i. e., "0" lead 235a, to "0" digit relay; "1" lead 235a, to "1" digit relay, etc. Hence when current is conducted to one of the digit leads 235a, the corresponding digit relay 222b is energized, all of the relays 222b being connected to the ground lead 249.

This energizing of the relay 222b causes it to attract its armature which opens the respective switch 246 in the digit relay holding circuit 248 thereby breaking the circuit thru any relay 222b previously energized, so as to release the armature thereof; and then closes switch 246 so as to render the holding circuit effective on the newly energized relay 222b. Also as the armature closes, it brings two contactors 227 carried by it into contact with respective contacts 232. This closes a circuit from positive lead 247 thru the corresponding digit magnet 221b, all of the digit magnets being grounded by connection to a lead 260 running to line 236. The other connection effected by the closing of the armature completes the holding circuit thru the relay so as to hold its armature in closed or attracted position.

The energizing of the respective digit magnet 221b causes it to attract or close its armature which operates the respective switch 246 to open and close the holding circuit for the digit magnets of that denomination thereby de-energizing any previously energized magnet and holding the new magnet energized. The breaking of this holding circuit also effects de-energizing of the cut-off-carry magnet 221f with results which will be presently described under the heading "Carrying".

*Carrying*

When magnet 221f was deenergized, it released its armature which then moved all of its contactors so that current is now cut-off the leads 251 thereby concluding the adding operation. The live contactor will now move into engagement with a single contact 261 connected to the lead 257, and current is now permitted to pass through this live contactor of the contactors on armatures of magnet 221f, through contact 261, lead 257, lead 255 to the "carry" magnet 221c, this magnet being grounded to lead 260. The energizing of magnet 221c closes or attracts its armature which effects the closing of several circuits. One of the contactors on this armature engages with a contact connected to the positive side of the magnet 221c, this contactor being itself connected with a lead 262 to one side of a relay 222f, the other side of said relay 222f being connected by a lead 263 to the lead 245 of the next higher denomination. The circuit thus formed is a holding circuit for the "carry" magnet 221c. The energizing of release relay 222f closes its armature thereby breaking the connection between leads 258 and 259 so that magnet 221e is de-energized, releasing its armature to bring its contactors again into circuit with respective carry-determining leads 235c.

The armature of "carry" magnet 221c also carries one or more carrying contactors. The number of these contactors is equal to the number of higher denominational orders in the machine. Thus in the lowest order of the "lower-digit" register there are here shown three such contactors, there being only three higher orders in this machine. If the machine were of a greater capacity then a correspondingly greater number of carry contactors would be provided. All of these carry contactors for one denomination are connected to the positive lead 247 of the denomination. One of these contactors engages a contact connected to a lead 264 which is connected directly to the "1" add lead 235c of the next higher order so that when current passes over this lead 264, one is carried to the next higher order. The other carry contacts are connected to leads 265 which may be termed "nine's-carry" leads as they are connected to contactors of the "9" digit armature of next higher order so that if this armature is closed contact will be made to conduct current over leads 264 and 265 from that order to the next higher. Thus if carrying is performed to a denomination already standing at "9" (i. e., having its "9" digit magnet 221b closed), carrying will be concomitantly performed to the still higher order.

When carrying is performed from one order to the next higher, the unit is being added into the higher order, causes one of the digit magnets 221b of this higher order to operate, thereby breaking the holding circuit at its switch 246.

It will be recalled that the relay 222f of the lower order is connected to the higher order holding circuit by lead 263. Consequently breaking of the holding circuit for the higher order releases the armature of relay 222f of the lower order and as lead 262 is also rendered dead, the "carry" magnet of the lower denomination also releases its armature.

*Determining the partial products*

After the multiplicand has been set up in the multiplicand register as has been described, depression of the digit keys according to the desired multiplier results in the determinnig of the corresponding partial products, and the sending of impulses to the product registers to register or add together these partial products. Presuming that 59 has been set up in the multiplicand register and that we now desire to multiply this amount by 37, we shall follow through the several actions that result in the accumulating of the partial products in the product registers.

At this time brushes 175 stand on contacts 181; brushes 171, on the two leftmost series of contacts 183; and brushes 168, on the two leftmost series of contacts 184; and all of the "0" magnets and relays 221b and 222b of the product registers are energized.

When the "3" digit key 109 is now depressed, its bail 114 makes contact with the "3" plunger 177 whereby current is transmitted through the "3" brush 175 and corresponding contact 181 to a respective lead 266 connected to one side of a respective key relay 222g. There are nine relays 222g one for each significant digit key, and controllable thereby. All relays 222g are grounded to a lead 268 connected to 236.

When any relay 222g is energized it attracts its armature 228 so as to bring its contactors 227 into engagement with a single contact 269 common to all of the relays 222g and connected to positive lead 240. There are on the armature of each relay 222g, two contactors for each denominational order of the multiplicand register and each contactor is connected by a lead 270 to a respective digital inlet bar 235, connected to a contactor of each armature of the respective denominational series of multiplicand registers 221a. There are two leads for each denomination, because the partial product for each denomination may be of two digits, and in that case one circuit must be closed for the "upper-digit" register and another for the "lower-digit" register.

In the particular embodiment, when the "3" key is depressed for the first or highest digit of the multiplier, the "3" relay 222g is closed and current passes to the "3" contactors of the tens and units armatures. Now in the tens denomination the "5" armature is closed so that the two live "3" contactors pass the current respectively to the "1" and "5" outlet bars 235a connected to the left-hand series of upper-digit brushes 171 and lower-digit brushes 168. Simultaneously the current which has been conducted to the lower denominational order of the multiplicand register has passed through the "3" contactors of the "9" register of this denomination to the "2" and "7" outlets 235a to the right-hand series of brushes 171 and 168, respectively. The two live brushes 171 at this time engage contacts 183 connected by leads 250 to the thousands and hundreds denominations of the "upper-digit" register, where the entry of "1" and "2", respectively, is effected in the manner already described under the heading "Adding". Also the live lower digit brushes 168 are in engagement with contacts 184 connected by leads 250 to the hundreds and tens denominations of the "lower-digit" register where the entry of "5" and "7", respectively is effected. Thus the partial products 15(00) and 27(0) have concomitantly entered in the product registers by depression of the "3" key.

When we now release the "3" key the carriage steps the brushes 171 and 168 to the next lower series of contacts 183 and 184, and the "3" relay 222g is opened to permit return of its armature to normal.

We now depress the "7" key 109 thereby closing the "7" relay 222g whereby circuits are closed to the "7" contactors on the "5" and "9" multiplicand magnets and thence over outlet leads 235a to the "3" and "6" brushes 171 of the respective series and the "5" and "3" brushes 168 of the respective series, it being remembered that the partial products are now 35 and 63. Since the carriage had stepped brushes 171 and 168 to the right one denomination, the "3" and "6" currents are conducted over leads 250 to the hundreds and tens denominations respectively of the "upper-digit" register and the values are accumulated therein, while the "5" and "3" currents from contacts 184 have been conducted over respective leads 250 to the tens and units denominations of the "lower-digit" register and the values are accumulated therein.

The carriage now steps again to the right, thereby bringing one of the brushes 175 over into engagement with the "total" contact 182. This brush may be one of the digital brushes or may be a separate one. In either case it is adapted to be rendered "live" by depression of the total key 111. At this time, the two product registers stand with such digit armatures closed by their magnets 221b, as to register the respective partial products 156(0) and 623. It is now necessary to cause the partial product on the "upper-digit" register to be added into the "lower-digit" register and the complete product to be displayed. To effect this result, I use what I term a totaling mechanism, and this will presently be described.

It should be noted that all of the armatures of relays 222g carry contactors which are normally connected in series as indicated at 281 and that this series of connections is connected at one end to a lead 282 to the positive lead 238, and at the other end to a lead 283 having connection with each of the magnets 221f. By this means the magnets 221f are energized when all of the relays 222g are open. But when a relay 222g is closed, then the series connection 281 is broken, and line 283 is dead. The magnets 221f remain closed because of the holding circuit hereinbefore described, until this holding circuit is broken as also above described. When however, the relay is again opened, the connection 281 is again completed and all magnets 221f energized so as to bring the registers into condition for the next adding operation.

*Totaling mechanism*

When the contact brush 175 engaging contact 182 is rendered live by depression of the total key 111, current is conducted by a lead 271 to a total relay 222t thereby energizing such relay which is also grounded to lead 268, and moving the armature to closed position thereby bringing all of its contactors into engagement with positive contact 269. This closes circuits through leads 272 from the contactors of this relay to respective inlet bars of the "upper-digit" register. There is one contactor and lead 272 for each denominational order of the "upper-digit" register (in this instance three); and the connected denominational leads are connected, respectively, to respective contactors on the armatures of the significant digit magnets. Each of these digital contactors has a corresponding contact connected by a lead 273 with the respective lead 250 of the corresponding denomination in the "lower-digit" register.

In the illustrative problem which we have been dealing with the partial product in the "upper-digit" register is 156—i. e., the "1", "5", and "6" armatures in the thousands, hundreds, and tens denominational orders stand closed. (There is no units denominational order in this register.) Consequently, when the leads 272 are rendered live, the current passes through the respective contactors and contacts at the "1", "5" and "6" magnets of the respective denominations, and thence over the corresponding leads 273 to the corresponding digit leads 250 of the respective denominations of the "lower-digit" register. This current passing over the "lower-digit" register leads causes the adding in of the respective digits precisely the same as if the current had been caused to flow over these leads by the depression of suitable digit keys as hereinbefore set forth. Thus the partial products are added together to form the complete product 2183.

The armatures "2", "1", "8", and "3" of the respective denominations of the "lower-digit" register now stand closed, and hold up their correllated pins 204 in the paths of fingers 203 of the bars 200, Fig. 6. The total key 111 is now released, and as it moves back to normal the carriage again escapes, and shutter 193, Figs. 1 and 3, clears the end of plate 186, whereupon the product indicator sectors 190 swing forward until stopped by the pins 204 engaging the cooperating fingers 203, at which time the complete product is indicated by these sectors.

*Clearing*

To return the carriage to its home position, the clear key 112 is depressed, with results which have already been partly described. The other operations performed concomitantly with the return of the carriage and indicator dials will now be set forth.

The lead 243 to the holding circuits of the multiplicand register is connected to a contact 274 and is ordinarily engaged by a plurality of contactors 275 connected by a lead 276 with the positive 238.

When the carriage is moved to its leftmost position which, it will be recalled, is beyond the "home" position, it moves all of the contactors 275 to the left thereby breaking the holding circuits for the multiplicand register so as to clear this register by deenergizing all of its magnets. The contacts 275 are moved by the carriage into engagement with respective contacts 277 on leads 278. There are as many leads 278 as there are denominational series of magnets in the two product registers (in this instance seven) and each lead 278 conducts current to the "0" digital outlet lead 235a of the correlated denominational series of magnets. This causes closing of the "0" armatures of the relays and magets 222b and 221b in all denominations of both product registers, whereby the products are erased from these registers and they all stand at zero or cleared.

When the multiplicand is not to be cleared, as where it is constant for a number of computations, a switch 279 is closed which completes a by-pass from 276 to 243. If this switch is closed, the holding circuit for the multiplicand register will not be opened by the return of the carriage.

*Addition*

Thus far we have considered the machine in the light of a multiplying machine. We shall now consider the operation of addition. To perform additon, set "1" in the lowest order column of the multiplicand register and make it a constant by closing switch 279. Also open a switch 280 between line 276 and the contactors 275 so that upon the return of the carriage, leads 278 will not be rendered live. Also render the left hand stops 125 ineffective so that the carriage after each return will stand in the first multiplier position. Now set up your first number as you would a multiplier. Then return the carriage by the clear key, and set up the next item to be added, etc. At any time a sub-total may be indicated by depressing the total key after adding and before operating the clear key. When it is desired to again clear the machine, close switch 280, open 279 and depress the clear key.

The theory in adding is that one times any number is the number itself and this, as will be seen is how addition may be performed. In addition no use is made of the "upper-digit" register, all amounts going directly to the "lower-digit" register, since one times any digit never gives a two digit product. This method of addition is utilized in this case because the circuit used is principally adapted for multiplication; but where the machine is to be utilized principally for adding another circuit would be used so that impulses might be sent directly to the register.

While I have described what I consider to be a desirable embodiment of my invention, it is obvious that many changes in details of construction and design might be made without departing from the sipirit of my invention. I, therefore, do not wish to be considered as limiting myself to the exact details of the embodiment herein set forth nor to anything less than the whole of my invention as hereinbefore described and as hereafter claimed.

I claim:

1. In a machine of the class described, the combination of a register including a denominational series of digit magnets, digit representing impulse transmitting controlling circuits for causing the energization of said digit magnets, means for controlling said circuits for causing the same to be rendered effective or ineffective, and means whereby each digit magnet, when energized by an impulse transmitted over said circuits when said circuits are effective, causes said controlling means to render said denominational controlling circuits ineffective so as to prevent further impulses from being transmitted to said digit magnets over said circuits.

2. In a machine of the character set forth, the combination of means for setting up a representation of a multiplicand and a multiplier, multiplier and multiplicand receiving and representing means set up under control of said setting means, an upper digit register and a lower digit register each of which comprises digit representing magnets and armatures, means controlled by said representing and receiving means for selecting and for entering the tens and units partial products in said respective registers to cause said magnets and armatures of the respective registers to represent the tens and units partial products, and means controlled by the armatures of one of said registers representing a partial product for entering in said other register said partial product to cause the armatures of said other register to represent the final product.

3. In a calculating machine, the combination of a plurality of denominational series of electromagnets including digit representing magnets, a series of digit inlet leads for each denominational series of magnets, a source of electric supply, means controllable from one of said denominational series of magnets for connecting said source to the lowest significant digit inlet lead of the next higher denominational order, and means controllable by the highest significant digit magnet of the said next higher denominational order for connecting said source to the lowest significant digit inlet lead of the denominational order next higher still.

4. In a calculating machine, the combination of a plurality of denominational series of electromagnets, a source of electric supply, means for connecting said source to one of the magnets of one of said series, means controllable by said one magnet for connecting said source to said one magnet, and means controllable by a magnet of a higher denominational series for effecting disconnecting of said one magnet from said source.

5. In a multiplying machine, the combination of a multiplicand receiving means comprising for each denomination a plurality of electromagnets and armatures closed by the energization of said electromagnets to represent multiplicand digits, a multiplier digit receiving means comprising a plurality of electromagnets and armatures closed by the energization of said electromagnets to represent multiplier digits, means for energizing said electromagnets of the aforesaid multiplicand and multiplier receiving means for setting up a representation of a multiplicand and a multiplier, a tens partial product receiving register and a units partial product receiving register, each of which comprises magnets and digit representing armatures, a plurality of sets of tens and units digit transmitting input circuits, there being one set of units and tens digit representing circuits for each denominational order of the multiplicand for transmitting electrical impulses to said digit representing magnets of the respective registers, tens and units partial product representing contact making means controlled by the multiplicand digit representing armatures of each denomination and partial product determining contact making means controlled by the multiplier digit representing armatures for selecting certain of said input circuits of said plurality of sets of circuits to effect the transmission of tens and units digit representing electrical impulses to energize the magnets of said registers to enter the tens and units partial products in the respective registers to cause the armatures of said registers to represent the digits of the tens and unit partial products, and means controlled by the armatures of one register representing the digits of a partial product for entering in said other register said partial product to cause the armatures of said other register to represent the final product.

6. In a multiplying machine, the combination of multiplicand receiving means comprising for each denomination a plurality of digit representing elements, a multiplier digit receiving means comprising a plurality of multiplier digit representing elements, multiplier digit entry means and means associated therewith for setting up a representation of a multiplicand in said first named elements and for setting up representations of multiplier digits of successive denominations in said multiplier digit representing elements, a tens partial product receiving register, a units partial product receiving register, entering means for the respective registers, a plurality of sets of tens and units digit transmitting circuits, there being a set of tens and a set of units digit transmitting circuits for each denominational order of the multiplicand for transmitting tens and units digit representing electrical impulses to the respective entering means of said registers, partial product representing contact making means controlled by said multiplicand digit representing elements and partial product determining contact making means controlled by the multiplier digit representing elements of successive denominations for selecting for successive multiplier digits circuits of said plurality of sets of circuits to effect the transmission of tens and units digit representing electrical impulses to the respective entering means to enter the tens and units partial product in the respective registers for each multiplier digit, column shift means effective upon setting up the next multiplier digit in the multiplier digit receiving means for causing the digit transmitting circuits selected by said contact making means under control of said multiplicand digit representing elements and the element representing the next or successive multiplier digit to transmit tens and units digit representing electrical impulses to the respective entering means to enter the tens and units partial product for the next multiplier digit in the respective registers, and means controlled by one register representing a partial product for entering in said other register said partial product to cause said other register to represent the final product.

7. In a multiplying machine, the combination of multiplicand digit receiving means comprising a plurality of denominational sets of magnets, settable means for receiving and representing a multiplier digit, an upper digit register comprising a plurality of denominational sets of magnets, a lower digit register comprising a plurality of denominational sets of magnets, multiplicand and multiplier entry means comprising means to selectively effect the energization of the magnets of the multiplicand receiving means upon multiplicand entry and for setting up a representation of a multiplier digit in said settable means upon multiplier digit entry, a carriage and circuit connecting means carried thereby for operatively associating upon a step by step movement of the carriage the first named sets of magnets in succession, set by set, with said multiplicand entry means and for operatively associating upon the next step of movement of said carriage the multiplier entry means with said settable means, partial product representing contact making means controlled by the energized magnets of said multiplicand digit receiving means and partial product determining contact making means controlled by the settable means representing a multiplier digit for effecting the transmission of digit representing electrical impulses to the magnets of said upper and lower digit registers to enter therein the tens and units partial products in the respective registers, electrical impulse entry directing means carried by said carriage and intermediate said contact making means and the denominational sets of magnets of each of said registers for directing upon the next step of movement of said carriage upon multiplier digit entry the entry of the tens and units partial product digit representing impulses to the respective sets of magnets of the respective registers, and means controlled by one register representing a partial product for entering in said other register said partial product to cause said other register to represent the final product.

8. In a multiplying machine, the combination of multiplicand digit receiving means comprising a plurality of denominational sets of magnets, settable means for receiving and representing a multiplier digit, an upper digit register comprising a plurality of denominational sets of magnets, a lower digit register comprising a plurality of denominational sets of magnets, multiplicand and multiplier entry means comprising means to selectively effect the energization of the magnets of the multiplicand receiving means upon multiplicand entry and for setting up a representation of a multiplier digit in said settable means upon multiplier digit entry, multiplicand magnet circuit connecting means, means for causing the operation of the latter to effect the energization of the selected magnets of the first named sets of magnets under control of said multiplicand entry means, partial product representing contact making means controlled by the energized magnets of said multiplicand digit receiving means and partial product determining contact making means controlled by the settable means representing a multiplier digit for selecting and effecting the transmission of digit representing electrical impulses to the magnets of said upper and lower digit registers to enter therein the tens and units partial products in the respective registers, electrical impulse entry directing means comprising means intermediate said contact making means and the denominational sets of magnets of each of said registers for directing the transmission of the tens and units partial product digit representing impulses to the respective sets of magnets of the respective registers, and means controlled by one register representing a partial product for entering in said other register said partial product to cause said other register to represent the final product.

9. In a multiplying machine, the combination of a multiplicand receiving means comprising for each denomination a plurality of digit representing elements, a multiplier receiving means comprising a plurality of digit representing elements, means for operating said first and second named elements to set up a representation of a multiplicand and multiplier, respectively, a tens partial product receiving register, and a units partial product receiving register, entering means for the respective registers, a plurality of sets of tens and units digit impulse transmitting circuits, there being one set of tens and one set of units digit impulse transmitting circuits for each denominational order of the multiplicand for transmitting digit representing electrical impulses to the respective entering means of said registers, partial product representing contact making means controlled by the respective multiplicand digit representing elements of each denomination and partial product determining contact making means controlled by the multiplier digit representing elements for selecting circuits of said plurality of sets of circuits to effect the concurrent transmission of all selected tens and units digit representing electrical impulses to the respective entering means of said registers to concurrently enter the tens and units partial product in the respective registers, and means controlled by one register representing a partial product for entering in said other register said partial product to cause said other register to represent the final product.

10. In a multiplying machine, the combination of a tens partial product receiving register, a units partial product receiving register, a multiplicand amount receiving and representing means representing a plurality of denominationally ordered multiplicand digits and a multiplier digit representing and receiving means representing one multiplier digit, means for setting up representations of denominationally ordered multiplicand digits and a multiplier digit in the respective representing and receiving means, units and tens partial product representing contact making means for each denominational order of the multiplicand operated by said multiplicand digit receiving means and partial product determining contact making means controlled by said multiplier digit receiving means for effecting the concurrent transmission of one tens digit representing impulse and one units digit representing impulse representing the tens and units digits of the tens and units partial products of each multiplicand digit set up and the multiplier digit set up, tens digit impulse transmitting means comprising said tens partial product representing contact making means for concurrently transmitting all tens digit impulses to the respective orders of the tens partial product receiving register and units digit impulse transmitting means comprising said units partial product representing contact making means for concurrently transmitting all units digit impulses to the respective orders of the units partial product receiving register, a source means for supplying an impulse for concurrent transmission through said transmitting means to enter in said registers the units and tens partial products of the multiplicand digits set up and the multiplier digit set up, and means under control of one register representing a partial product for transferring said partial product to the other of said registers representing the other partial product to cause said other register to represent the final product.

11. In a multiplying machine, multiplier digit and multiplicand digit receiving and representing means, means for setting up representations of a multiplier digit and denominationally ordered multiplicand digits therein, a tens partial product receiving register and a units partial product receiving register, entering means therefor, a plurality of sets of tens and unit digit impulse transmitting circuits, there being one set of tens and one set of units digit transmitting circuits for each denominational order of the multiplicand for transmitting tens and units digit representing electrical impulses to the respective entering means of said registers, partial product representing contact making means for each denominational order of the multiplicand controlled by said multiplicand receiving means and partial product determining contact making means controlled by said multiplier digit receiving means for selecting tens and units digit transmitting circuits of said plurality of sets for effecting the transmission of tens and unit digit representing electrical impulses to the respective entering means to enter the tens and units partial products in the respective tens and units partial product receiving registers, transfer means for transferring the partial product represented by denominational orders of one of said registers to the other register containing the other partial product comprising, a plurality of sets of denominationally ordered digit impulse transmitting circuits for controlling like denominationally ordered entering means for said other register, and means effective upon tens and units partial product entries for causing the register from which a transfer of a partial product is to be effected to select digit transmitting circuits of said last named plurality of sets of circuits to operate the respective entering means for said other register to cause said other register to represent the final product.

12. In a multiplying machine, the combination with a multiplicand receiving and representing means, of a plurality of keys, entry means controlled by said keys for entering a multiplicand amount in said receiving means, a multiplier digit representing and receiving means, entry means controlled by said keys for entering a multiplier digit in the last named receiving and representing means, a tens partial product receiving register, a units partial product receiving register each of which registers comprise a plurality of denominationally ordered sets of magnets and armatures, the latter being utilized for representing digits when in closed position, partial product representing contact making means under control of said multiplicand receiving means and partial product determining contact making means controlled by said multiplier digit receiving means in accordance with the multiplicand and multiplier amounts for distributing electrical impulses representing the tens and units partial products from a source means to the magnets of the respective registers to enter the tens and units partial products therein, and means controlled by the armatures of one of said registers representing a partial product for entering said partial product in the other of said registers to cause the armatures of said other register to represent the final product.

13. In a multiplying machine, the combination of a multiplicand digit receiving means comprising a plurality of denominational sets of magnets, an entry means comprising a plurality of keys, a carriage and circuit connecting means carried thereby for operatively associating upon a step by step movement of the carriage said sets of magnets, set by set, with said entry means to energize a magnet in each denominational set to represent multiplicant digits, means under control of said keys for effecting a step by step movement of said carriage, multiplier digit receiving means comprising a set of magnets, circuit closing means carried by said carriage for operatively associating said last named set of magnets with said keys upon a stepping of said carriage following multiplicand entry for energizing one of said magnets to represent a multiplier digit, said circuit closing means being effective upon the next step of movement of the carriage for energizing a subsequent multiplier digit representing magnet upon the successive multiplier digit entry, separate partial product representing contact making means for each denominational set of multiplicand magnets operated by the energized magnets of each set and other partial product contact making means operated successively by the energized magnets representing multiplier digits for concurrently transmitting a plurality of digit representing electrical impulses representing the tens and units partial products of the multiplicand digits and each multiplier digit, a tens partial product receiving register and a units partial product receiving register each of which comprises denominational sets of magnets and armatures closed thereby to represent digits, denominational entry routing means carried by said carriage and operable upon a step of movement of the carriage following the last multiplicand digit entry and when said first multiplier digit is set up for denominationally routing the electrical impulses representing the tens and units partial products of the multiplicand and the first multiplier digit into respective denominational orders of said registers, said entry routing means being effective upon the next step of movement of the carriage upon entry of the next multiplier digit to effect a column shift to direct the electrical impulses representing the tens and units partial products of the multiplicand and second multiplier digit in respective denominational orders of said registers, and means controlled by the armatures of one of said registers representing a partial product for entering in said other register said partial product to cause the armatures of said other register to represent the final product.

14. An accumulating mechanism having a plurality of denominational orders, each order comprising a digit receiving means consisting of a set of ten relays representing digits 0-9 inclusive, a digit representing magnet for each relay, and armatures closed by the energization of said magnets, a series of digit transmitting lines for transmitting electrical impulses representing any of the digits 1-9, a set of digit contactors carried by each armature and each connected to the related digit transmitting line, a set of contacts cooperating with each set of said contactors, a network of conductors from each of said sets of said contacts to said relays and arranged and interconnected so as to transmit a digit representing impulse transmitted from a digit transmitting line through a related digit contactor carried by a closed armature of a previously energized digit magnet to another relay representing the sum of the digit to be entered and the digit represented by the previously energized magnet and related relay to cause the energization of said other relay, means controlled by each relay for effecting upon its energization the energization of the related magnet and the engagement of related contactors of the armature closed thereby with the related set of contacts, to thereby enable said digit transmitting lines to effect the entry of a successive digit, and means for normally effecting the closure of the armature of the "0" digit representing magnet when the other magnets representing any of the other digits 1-9 inclusive are deenergized preliminarily to an accmulating operation.

15. An accumulating mechanism having a plurality of denominational orders, each comprising digit receiving means consisting of a set of ten relays representing digits 0-9 inclusive, a digit representing magnet for each relay, and armatures closed by the energization of said magnets, a series of digit transmitting lines for each order of the digit receiving means for concurrently transmitting electrical impulses representing any of the digits 1-9, a set of digit contactors carried by each armature of a set of magnets and each interconnected to the related digit transmitting line of the associated series, a set of contacts cooperating with each set of said contactors, a network of conductors from each of said sets of said contacts to said relays and arranged and interconnected so as to transmit a digit representing impulse from a digit transmitting line transmitted through a related digit contactor carried by a closed armature of a previously energized digit magnet to another relay representing the sum of the digit to be entered and the digit represented by the previously energized magnet and related relay to cause the energization of said other relay, means controlled by each relay for effecting upon its energization the energization of the related magnet of the related order and the engagement of related contactors of the armature closed thereby with the related set of contacts to thereby enable said digit lines to effect the entry of a successive digit, means for normally effecting the closure of the armature of the "0" digit representing magnet of each denominational order upon the deenergization of other magnets of the same set representing any of the other digits 1–9 inclusive, and means for effecting the concurrent transmission of digit representing impulses each over a related transmitting line of the related series to effect concurrent digit entries in all denominational orders.

ROBERT EDWARD PARIS.